US012633299B2

(12) United States Patent
Meng et al.

(10) Patent No.: US 12,633,299 B2
(45) Date of Patent: May 19, 2026

(54) LINEAR PREDICTION CODING PARAMETER CODING METHOD AND CODING APPARATUS

(71) Applicant: HUAWEI TECHNOLOGIES CO., LTD., Shenzhen (CN)

(72) Inventors: Xianbo Meng, Beijing (CN); Bingyin Xia, Beijing (CN); Zhe Wang, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 404 days.

(21) Appl. No.: 17/974,851

(22) Filed: Oct. 27, 2022

(65) Prior Publication Data

US 2023/0046850 A1 Feb. 16, 2023

Related U.S. Application Data

(63) Continuation of application No. PCT/CN2021/070115, filed on Jan. 4, 2021.

(30) Foreign Application Priority Data

Apr. 28, 2020 (CN) ........................ 202010349207.5

(51) Int. Cl.
*G10L 19/08* (2013.01)
*G10L 19/008* (2013.01)
*G10L 19/032* (2013.01)

(52) U.S. Cl.
CPC ............ *G10L 19/08* (2013.01); *G10L 19/008* (2013.01); *G10L 19/032* (2013.01)

(58) Field of Classification Search
CPC ..... G10L 19/08; G10L 19/008; G10L 19/032; G10L 19/07; G10L 19/087
See application file for complete search history.

(56) References Cited

U.S. PATENT DOCUMENTS 5,648,989 A * 7/1997 Ko .......................... G10L 19/06 704/E19.024
7,143,030 B2 * 11/2006 Chen ....................... G10L 19/02 704/E19.01
7,590,531 B2 * 9/2009 Khalil .................. G10L 19/005 704/226
9,129,593 B2 * 9/2015 Ojala .................... G10L 19/008
(Continued)

FOREIGN PATENT DOCUMENTS

CN 101460998 A * 6/2009 ............. G10L 19/06
CN 101609680 A 12/2009
(Continued)

*Primary Examiner* — Richemond Dorvil
*Assistant Examiner* — Zeeshan Mahmood Shaikh
(74) *Attorney, Agent, or Firm* — WOMBLE BOND DICKINSON (US) LLP

(57) ABSTRACT

A linear prediction coding (LPC) parameter coding method is provided. The method includes: determining a reference LPC parameter from a plurality of LPC parameters, performing direct coding on the reference LPC parameter, and performing reference coding on a non-reference LPC parameter based on the determined LPC parameter. The method includes: obtaining a direct coding result of the reference LPC parameter and determining a residual coding result of the non-reference LPC parameter.

15 Claims, 9 Drawing Sheets

(56) References Cited

U.S. PATENT DOCUMENTS

| | | | | |
|---|---|---|---|---|
| 2006/0031065 | A1 | 2/2006 | Liljeryd et al. | |
| 2006/0271354 | A1* | 11/2006 | Sun | G10L 19/26 704/205 |
| 2010/0023325 | A1* | 1/2010 | Bessette | G10L 19/06 704/219 |
| 2012/0245947 | A1* | 9/2012 | Neuendorf | G10L 19/20 704/500 |
| 2015/0106108 | A1* | 4/2015 | Baeckstroem | G10L 19/02 704/500 |
| 2018/0261231 | A1 | 9/2018 | Vaillancourt et al. | |
| 2020/0126575 | A1* | 4/2020 | Vasilache | G10L 19/032 |

FOREIGN PATENT DOCUMENTS

| | | | |
|---|---|---|---|
| CN | 101944362 | A | 1/2011 |
| CN | 102982807 | A | 3/2013 |
| CN | 110709925 | A | 1/2020 |
| CN | 110853659 | A | 2/2020 |
| EP | 2439737 | B1 | 1/2014 |
| EP | 2919232 | A1 | 9/2015 |
| EP | 3252763 | A1 | 12/2017 |
| EP | 3610481 | A1 | 2/2020 |
| JP | 2005115267 | A | 4/2005 |
| RU | 2439718 | C1 | 1/2012 |
| RU | 2018114899 | A | 10/2019 |
| TW | 201732783 | A | 9/2017 |
| WO | 2018189414 | A1 | 10/2018 |

* cited by examiner

LINEAR PREDICTION CODING PARAMETER CODING METHOD AND CODING APPARATUS

CROSS-REFERENCE TO RELATED APPLICATIONS

This application is a continuation of International Application No. PCT/CN2021/070115, filed on Jan. 4, 2021, which claims priority to Chinese Patent Application No. 202010349207.5, filed on Apr. 28, 2020. The disclosures of the aforementioned applications are hereby incorporated by reference in their entireties.

TECHNICAL FIELD

This application relates to the field of communication technologies, and in particular, to a linear prediction coding parameter coding method and a coding apparatus.

BACKGROUND

To facilitate efficient storage and transmission of audio signals, an audio encoder needs to compress the audio signals into coded bitstreams. A coding algorithm based on linear prediction analysis is one of the most commonly used coding algorithms for the audio signals. A main principle of the coding algorithm is to solve a linear prediction coding (LPC) parameter by using short-range dependence of the audio signals, and then filter the audio signals by using a linear prediction filter, to effectively reduce a coding bit rate. The LPC parameter is a mathematical model parameter of the linear prediction filter, and is one of important parameters in coding. An LPC parameter coding method affects quality of audio signal coding, and coding and transmission of the LPC parameter occupies a specific bit rate.

For a multi-channel audio signal, an existing LPC parameter coding method includes independent coding and reference coding. In an independent coding scheme, similarity of LPC parameters between channels is not considered. Therefore, much redundant information exists between quantized LPC parameters of all channels, and a high bit rate is occupied. In a reference coding scheme, direct quantization coding is first performed on an LPC parameter of a channel, and residual quantization coding is separately performed on the LPC parameters of the channel and another channel. Finally, a quantization coding scheme is determined based on coding effect, and a final quantization coding result of the LPC parameter is written into a coded bitstream.

When an LPC parameter of a channel is encoded in a reference coding scheme, residual quantization coding needs to be separately performed with another channel, to compare coding effect to determine a coding scheme. When there are a large quantity of channels, an amount of calculation for residual quantization coding is large.

SUMMARY

Embodiments of this application provide a linear prediction coding parameter coding method, to remove redundancy of LPC parameters between channels, reduce a quantity of bits occupied for quantization coding of LPC parameters of multiple channels, and reduce calculation complexity of reference quantization coding on LPC parameters between channels while an amount of algorithm calculation is considered.

A first aspect of embodiments of this application provides an LPC parameter coding method, including: obtaining to-be-coded LPC parameters of at least two channels of an audio signal; determining a reference LPC parameter from the to-be-coded LPC parameters of the at least two channels, where an LPC parameter other than the reference LPC parameter in the to-be-coded LPC parameters of the at least two channels is a non-reference LPC parameter; obtaining a direct coding result of the reference LPC parameter; determining a residual of the non-reference LPC parameter based on the reference LPC parameter; determining a residual coding result of the non-reference LPC parameter based on the direct coding result of the reference LPC parameter and the residual; and writing the direct coding result of the reference LPC parameter and the residual coding result of the non-reference LPC parameter into a coded bitstream.

The to-be-coded LPC parameter includes an original LPC parameter, a high-dimensional LPC parameter, or a high-dimensional LPC parameter obtained after the original LPC parameter is split.

The LPC parameter coding method provided in this embodiment of this application is applied to LPC parameter coding of a multi-channel audio signal. A reference LPC parameter is determined from LPC parameters of a plurality of channels, direct coding is performed on the reference LPC parameter, to obtain a direct coding result, and reference coding is performed on a non-reference LPC parameter based on the reference LPC parameter, to obtain a residual coding result. Therefore, for the non-reference LPC parameter, selection among a plurality of schemes based on different reference LPC parameters is not needed. This can reduce an amount of calculation and improve coding efficiency.

In addition, similarity of the LPC parameters between channels is considered through reference coding. This reduces redundant information between quantized LPC parameters of all channels, and reduces a quantity of occupied bits.

In an embodiment, the determining a reference LPC parameter from the to-be-coded LPC parameters of the at least two channels includes: determining an LPC parameter that is in the to-be-coded LPC parameters of the at least two channels and that requires a minimum quantity of bits for direct quantization coding as the reference LPC parameter.

According to the LPC parameter coding method provided in this embodiment of this application, the reference LPC parameter is selected from the plurality of LPC parameters by comparing quantities of bits required for direct quantization coding of the parameters. This can reduce a quantity of bits required for direct quantization coding of the reference LPC parameter.

In an embodiment, the to-be-coded LPC parameters of the at least two channels include to-be-coded LPC parameters of at least three channels. The determining a reference LPC parameter from the to-be-coded LPC parameters of the at least two channels includes: obtaining an absolute value of a difference between each LPC parameter in the to-be-coded LPC parameters of the at least three channels and another LPC parameter; obtaining an average value of absolute values of differences between each LPC parameter and other LPC parameters; and determining an LPC parameter that is in the LPC parameters and that has a minimum average value of the absolute values of the differences as the reference LPC parameter.

According to the LPC parameter coding method provided in this embodiment of this application, a specific implementation of determining the reference LPC parameter from the LPC parameters of the at least three channels is provided. To be specific, an LPC parameter that has a minimum difference from other LPC parameters is selected as the reference LPC parameter. Selecting the LPC parameter with the minimum difference can reduce distortion during reference quantization coding performed on the non-reference LPC parameter, and reduce a quantity of bits occupied for LPC parameter quantization coding.

In an embodiment, the difference includes a mean squared error or a cosine distance.

According to the LPC parameter coding method provided in this embodiment of this application, two specific methods for calculating a difference between LPC parameters are provided. This improves flexibility of solution implementation.

In an embodiment, the audio signal includes a plurality of channels, and the method further includes: determining a plurality of parameter groups by grouping to-be-coded LPC parameters of the plurality of channels of the audio signal. One of the plurality of parameter groups includes the to-be-coded LPC parameters of the at least two channels, and the LPC parameters in the plurality of parameter groups have no intersection. The plurality of channels include at least four channels, and the plurality of parameter groups include at least two parameter groups.

The LPC parameter coding method provided in this embodiment of this application is mainly applied to an audio signal with a large quantity of channels. LPC parameters of a plurality of channels are first grouped, one reference LPC parameter is selected from each LPC parameter group, and reference coding is performed on a non-reference LPC parameter in the group based on the reference LPC parameter. Compared with reference coding performed on LPC parameters of all channels based on a same LPC parameter, distortion can be reduced. In an embodiment, each parameter set includes at least two LPC parameters.

In an embodiment, the determining a plurality of parameter groups by grouping to-be-coded LPC parameters of the plurality of channels of the audio signal includes: determining the plurality of parameter groups based on channel numbers of the plurality of channels of the audio signal; or determining the plurality of parameter groups based on a position of a speaker corresponding to each of the plurality of channels of the audio signal.

According to the LPC parameter coding method provided in this embodiment of this application, when LPC parameters of multiple channels are grouped, grouping may be performed based on channel numbers or speaker positions corresponding to the channels, to provide a specific implementation of grouping. This improves flexibility of solution implementation.

In an embodiment, the determining a plurality of parameter groups by grouping to-be-coded LPC parameters of the plurality of channels of the audio signal includes: clustering the to-be-coded LPC parameters of the plurality of channels of the audio signal, to determine the plurality of parameter groups.

According to the LPC parameter coding method provided in this embodiment of this application, grouping is performed based on LPC parameters of all channels by using a clustering method. A plurality of obtained parameter groups have similar LPC parameters. This can reduce distortion of reference coding, reduce a quantity of bits required for reference coding, and improve coding effect of reference coding.

In an embodiment, the clustering the to-be-coded LPC parameters of the plurality of channels of the audio signal, to determine the plurality of parameter groups includes: determining M LPC parameters from the to-be-coded LPC parameters of the plurality of channels, where an average value of absolute values of differences between the M LPC parameters is greater than or equal to an average value of absolute values of differences between any M LPC parameters in the LPC parameters of the plurality of channels, the M LPC parameters are clustering centers of M parameter groups, and M is a preset value; and performing clustering based on the M clustering centers, to determine the M parameter groups, where an absolute value of a difference between a first LPC parameter and a second LPC parameter in a first parameter group in the M parameter groups is less than an absolute value of a difference between the first LPC parameter and a third LPC parameter, the second LPC parameter is a clustering center of the first parameter group, the third LPC parameter is a clustering center of a second parameter group, and the first parameter group and the second parameter group are any two different parameter groups in the M parameter groups.

The differences between the M LPC parameters include a difference between any two of the M LPC parameters, and the average value of the absolute values of the differences between the M LPC parameters is an average value of absolute values of $M\times(M-1)/2$ difference values.

According to the LPC parameter coding method provided in this embodiment of this application, a specific clustering method for grouping LPC parameters of multiple channels into M preset groups is provided. To be specific, M LPC parameters with a maximum difference are first determined as clustering centers, and then other LPC parameters with a minimum difference from the clustering centers are grouped into a same group. In this way, a difference between LPC parameters in a group is small. This can reduce distortion of reference coding, reduce a quantity of bits required for reference coding, and improve coding effect of reference coding.

In an embodiment, the obtaining to-be-coded LPC parameters of at least two channels of an audio signal includes: splitting original LPC parameters of the at least two channels of the audio signal, to obtain a high-dimensional LPC parameter group and a low-dimensional LPC parameter group. The high-dimensional LPC parameter group includes the to-be-coded LPC parameters of the at least two channels, or the low-dimensional LPC parameter group includes the to-be-coded LPC parameters of the at least two channels. In an embodiment, a dimension of an LPC parameter in the high-dimensional LPC parameter set is the same as a dimension of an LPC parameter in the low-dimensional LPC parameter set.

According to the LPC parameter coding method provided in this embodiment of this application, original LPC parameters of all audio signals may be split based on a dimension, and a high-dimensional LPC parameter group and a low-dimensional LPC parameter group that are obtained are separately coded. This improves flexibility of coding scheme selection. For example, in a scenario in which high-dimensional LPC parameters of a multi-channel audio signal are highly similar and low-dimensional LPC parameters differ greatly, reference coding may be performed on the high-dimensional LPC parameter group, and direct coding is performed on the low-dimensional LPC parameter group. Selection of a coding scheme matches an actual application scenario. This improves coding effect of reference coding.

In an embodiment, the audio signal includes a plurality of channels, and the obtaining to-be-coded LPC parameters of at least two channels of an audio signal includes: splitting original LPC parameters of the plurality of channels of the audio signal, to obtain a high-dimensional LPC parameter group and a low-dimensional LPC parameter group; and obtaining a plurality of high-dimensional parameter groups by grouping LPC parameters in the high-dimensional LPC parameter group, where one of the plurality of high-dimensional parameter groups includes the to-be-coded LPC parameters of the at least two channels, and LPC parameters in the plurality of high-dimensional parameter groups have no intersection; or obtaining a plurality of low-dimensional parameter groups by grouping LPC parameters in the low-dimensional LPC parameter group, where one of the plurality of low-dimensional parameter groups includes the to-be-coded LPC parameters of the at least two channels, and LPC parameters in the plurality of low-dimensional parameter groups have no intersection. The plurality of channels include at least four channels, the plurality of high-dimensional parameter groups include at least two parameter groups, and the plurality of low-dimensional parameter groups include at least two parameter groups.

According to the LPC parameter coding method provided in this embodiment of this application, original LPC parameters of all audio signals are split based on a dimension, to obtain a high-dimensional LPC parameter group and a low-dimensional LPC parameter group. If the audio signal has a large quantity of channels, LPC parameters in the high-dimensional LPC parameter group of the plurality of channels may be further grouped, or LPC parameters in the low-dimensional LPC parameter group may be further grouped. By splitting the LPC parameters and grouping the LPC parameters, an actual coding requirement can be met, and coding effect of reference coding can be improved.

In an embodiment, before the determining a reference LPC parameter from the LPC parameters of the at least two channels, the method further includes: determining that an absolute value of a difference between LPC parameters of every two channels in the at least two channels is less than or equal to a preset threshold. The difference between the LPC parameters of the two channels includes an average value of mean squared errors or an average value of cosine distances between the LPC parameters of the two channels. In an embodiment, if an absolute value of a difference between LPC parameters of two channels in the at least two channels is greater than the preset threshold, direct coding is performed on the non-reference LPC parameter, to obtain a direct coding result of the non-reference LPC parameter, and the direct coding result is written into a coded bitstream.

According to the LPC parameter coding method provided in this embodiment of this application, reference coding is performed when a preset condition is met. The preset condition is that a difference between LPC parameters is less than or equal to a preset threshold. Reference coding is performed on an LPC parameter with a small difference. This can reduce a quantity of bits occupied by a quantization coding result.

In an embodiment, before the writing the direct coding result of the reference LPC parameter and the residual coding result of the non-reference LPC parameter into a coded bitstream, the method further includes: obtaining a direct coding result of the non-reference LPC parameter; and determining that a difference between first distortion and second distortion is less than or equal to a first preset threshold. The first distortion is distortion of the residual coding result of the non-reference LPC parameter relative to the non-reference LPC parameter, and the second distortion is distortion of the direct coding result of the non-reference LPC parameter relative to the non-reference LPC parameter. In an embodiment, if the difference between the first distortion and the second distortion is greater than the first preset threshold, direct coding is performed on the non-reference LPC parameter, to obtain a direct coding result of the non-reference LPC parameter, and the direct coding result is written into the coded bitstream.

According to the LPC parameter coding method provided in this embodiment of this application, a preset condition needs to be met before reference coding is performed on a non-reference LPC parameter. To be specific, a difference between distortion of reference coding performed on the non-reference LPC parameter and distortion of direct coding performed on the non-reference LPC parameter is less than or equal to the first preset threshold. This limits the distortion of reference coding. If the distortion of reference coding is greater than the first preset threshold, a coding result may be obtained in a direct coding manner. This can ensure an effect of LPC parameter coding in this solution.

In an embodiment, before the writing the direct coding result of the reference LPC parameter and the residual coding result of the non-reference LPC parameter into a coded bitstream, the method further includes: determining that a difference between a first bit quantity and a second bit quantity is greater than a second preset threshold. The first bit quantity is a quantity of bits required for directly coding the non-reference LPC parameter, and the second bit quantity is a quantity of bits required for coding the non-reference LPC parameter based on the direct coding result of the reference LPC parameter and the residual. In an embodiment, if the difference between the first bit quantity and the second bit quantity is less than the second preset threshold, direct coding is performed on the non-reference LPC parameter, to obtain a direct coding result of the non-reference LPC parameter, and the direct coding result is written into the coded bitstream.

According to the LPC parameter coding method provided in this embodiment of this application, another preset condition further needs to be met before reference coding is performed on a non-reference LPC parameter. To be specific, compared with direct coding, reference coding can save a specific quantity of bits. Therefore, selecting reference coding can reduce a quantity of bits of an LPC quantization coding result. If the preset condition cannot be met, direct coding is performed on the non-reference LPC parameter.

A second aspect of embodiments of this application provides a coding apparatus, including: an obtaining unit, configured to obtain to-be-coded LPC parameters of at least two channels of an audio signal; a determining unit, configured to determine a reference LPC parameter from the to-be-coded LPC parameters of the at least two channels, where an LPC parameter other than the reference LPC parameter in the to-be-coded LPC parameters of the at least two channels is a non-reference LPC parameter, the obtaining unit is further configured to obtain a direct coding result of the reference LPC parameter, the determining unit is further configured to determine a residual of the non-reference LPC parameter based on the reference LPC parameter; and the determining unit is further configured to determine a residual coding result of the non-reference LPC parameter based on the direct coding result of the reference LPC parameter and the residual; and a processing unit, configured to write the direct coding result of the reference LPC parameter and the residual coding result of the non-reference LPC parameter into a coded bitstream.

In an embodiment, the determining unit is specifically configured to determine an LPC parameter that is in the to-be-coded LPC parameters of the at least two channels and that requires a minimum quantity of bits for direct quantization coding as the reference LPC parameter.

In an embodiment, the to-be-coded LPC parameters of the at least two channels include to-be-coded LPC parameters of at least three channels. The obtaining unit is specifically configured to: obtain an absolute value of a difference between each LPC parameter in the to-be-coded LPC parameters of the at least three channels and another LPC parameter; and obtain an average value of absolute values of differences between each LPC parameter and other LPC parameters. The determining unit is specifically configured to determine an LPC parameter with a minimum average value of the absolute values of the differences between the LPC parameters as the reference LPC parameter.

In an embodiment, the difference includes a mean squared error or a cosine distance.

In an embodiment, the audio signal includes a plurality of channels, and the determining unit is further configured to: determine a plurality of parameter groups by grouping to-be-coded LPC parameters of the plurality of channels of the audio signal. One of the plurality of parameter groups includes the to-be-coded LPC parameters of the at least two channels, and the LPC parameters in the plurality of parameter groups have no intersection.

In an embodiment, the determining unit is specifically configured to: determine the plurality of parameter groups based on channel numbers of the plurality of channels of the audio signal; or determine the plurality of parameter groups based on a position of a speaker corresponding to each of the plurality of channels of the audio signal.

In an embodiment, the determining unit is specifically configured to cluster the to-be-coded LPC parameters of the plurality of channels of the audio signal, to determine the plurality of parameter groups.

In an embodiment, the determining unit is specifically configured to: determine M LPC parameters from the to-be-coded LPC parameters of the plurality of channels, where an average value of absolute values of differences between the M LPC parameters is greater than or equal to an average value of absolute values of differences between any M LPC parameters in the LPC parameters of the plurality of channels, the M LPC parameters are clustering centers of M parameter groups, and M is a preset value; and perform clustering based on the M clustering centers, to determine the M parameter groups. An absolute value of a difference between a first LPC parameter and a second LPC parameter in a first parameter group in the M parameter groups is less than an absolute value of a difference between the first LPC parameter and a third LPC parameter, the second LPC parameter is a clustering center of the first parameter group, the third LPC parameter is a clustering center of a second parameter group, and the first parameter group and the second parameter group are any two different parameter groups in the M parameter groups.

In an embodiment, the obtaining unit is specifically configured to: split original LPC parameters of the at least two channels of the audio signal, to obtain a high-dimensional LPC parameter group and a low-dimensional LPC parameter group. The high-dimensional LPC parameter group includes the to-be-coded LPC parameters of the at least two channels, or the low-dimensional LPC parameter group includes the to-be-coded LPC parameters of the at least two channels.

In an embodiment, the audio signal includes a plurality of channels; and the obtaining unit is specifically configured to: split original LPC parameters of the plurality of channels of the audio signal, to obtain a high-dimensional LPC parameter group and a low-dimensional LPC parameter group; and obtain a plurality of high-dimensional parameter groups by grouping LPC parameters in the high-dimensional LPC parameter group, where one of the plurality of high-dimensional parameter groups includes the to-be-coded LPC parameters of the at least two channels, and LPC parameters in the plurality of high-dimensional parameter groups have no intersection; or obtain a plurality of low-dimensional parameter groups by grouping LPC parameters in the low-dimensional LPC parameter group, where one of the plurality of low-dimensional parameter groups includes the to-be-coded LPC parameters of the at least two channels, and LPC parameters in the plurality of low-dimensional parameter groups have no intersection.

In an embodiment, the determining unit is further configured to: determine that an absolute value of a difference between LPC parameters of every two channels in the at least two channels is less than or equal to a preset threshold. The difference between the LPC parameters of the two channels includes an average value of mean squared errors or an average value of cosine distances between the LPC parameters of the two channels.

In an embodiment, the obtaining unit is further configured to: obtain a direct coding result of the non-reference LPC parameter. The determining unit is further configured to determine that a difference between first distortion and second distortion is less than or equal to a first preset threshold. The first distortion is distortion of the residual coding result of the non-reference LPC parameter relative to the non-reference LPC parameter, and the second distortion is distortion of the direct coding result of the non-reference LPC parameter relative to the non-reference LPC parameter.

In an embodiment, the determining unit is further configured to determine that a difference between a first bit quantity and a second bit quantity is greater than or equal to a second preset threshold. The first bit quantity is a quantity of bits required for directly coding the non-reference LPC parameter, and the second bit quantity is a quantity of bits required for coding the non-reference LPC parameter based on the direct coding result of the reference LPC parameter and the residual.

A third aspect of embodiments of this application provides a coding apparatus, including a processor and a memory. The processor and the memory are connected to each other, the memory is configured to store a computer program, the computer program includes program instructions, and the processor is configured to invoke the program instructions, to perform the method according to any one of the first aspect and the possible implementations.

A fourth aspect of embodiments of this application provides a computer program product including instructions. When the computer program product runs on a computer, the computer is enabled to perform the method according to any one of the first aspect and the possible implementations.

A fifth aspect of embodiments of this application provides a computer-readable storage medium including instructions. When the instructions are run on a computer, the computer is enabled to perform the method according to any one of the first aspect and the possible implementations.

A sixth aspect of embodiments of this application provides a computer-readable storage medium, including a coded bitstream obtained by using the method according to any one of the first aspect and the possible implementations.

A seventh aspect of embodiments of this application provides a chip, including a processor. The processor is configured to read and execute a computer program stored in a memory, to perform the method according to any possible implementation of any one of the foregoing aspects. In an embodiment, the chip includes a memory, and the memory and the processor are connected by using a circuit or a wire. Further, in an embodiment, the chip further includes a communication interface, and the processor is connected to the communication interface. The communication interface is configured to receive data and/or information that needs to be processed. The processor obtains the data and/or the information from the communication interface, processes the data and/or the information, and outputs a processing result through the communication interface. The communication interface may be an input/output interface.

An eighth aspect of embodiments of this application provides a coding apparatus, including a processor and a communication interface. The processor reads and stores a computer program through the communication interface, the computer program includes program instructions, and the processor is configured to invoke the program instructions, to perform the method according to any one of the first aspect and the possible implementations.

A ninth aspect of embodiments of this application provides a coding apparatus, including a processor and a memory. The processor is configured to perform the method according to any one of the first aspect and the possible implementations, and the memory is configured to store the coded bitstream.

Embodiments of this application provide a linear prediction coding parameter coding method, and beneficial effect of the method is as follows:

A reference LPC parameter is determined from a plurality of LPC parameters, and reference coding may be performed on an LPC parameter of a non-reference channel based on the reference LPC parameter. Compared with a conventional technology in which reference coding is performed based on a plurality of reference LPC parameters, an amount of calculation can be reduced.

In addition, the coding method can remove redundancy of LPC parameters between channels, reduce a quantity of bits occupied for quantization coding of LPC parameters of multiple channels, and reduce calculation complexity of reference quantization coding on LPC parameters between channels while an amount of algorithm calculation is considered.

DESCRIPTION OF EMBODIMENTS

Figure 1:
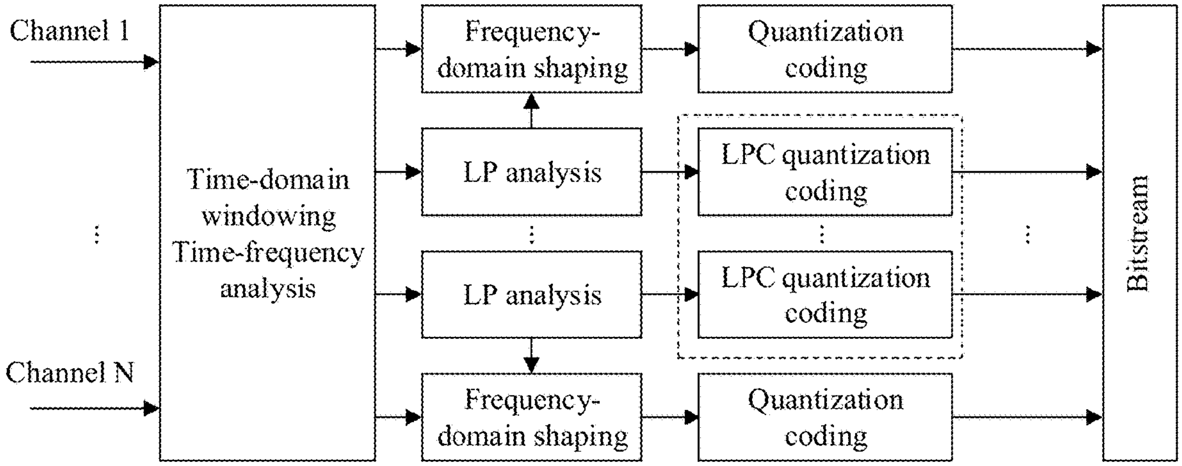
FIG. 1 is a schematic diagram of a typical multi-channel audio coding framework based on linear prediction analysis.

Embodiments of this application provide a linear prediction coding parameter coding method, to reduce an amount of calculation for coding.

For ease of understanding, the following briefly describes some technical terms in embodiments of this application.

1. LPC parameter: The LPC parameter may be represented in a plurality of forms, for example, a linear prediction analysis (LPA) coefficient, a line spectrum frequency (LSF) parameter, a line spectrum pair (LSP) parameter, and a reflection coefficient. A specific form of the linear prediction coding parameter is not limited in embodiments of this application. The linear prediction coding parameter being an LSF parameter is used as an example in the following embodiments.

2. Bit rate: The bit rate is a quantity of bits transmitted per second.

3. Direct quantization coding: An LPC parameter is encoded by using an existing coding technology. In embodiments of this application, the LPC parameter is encoded by using a fixed codebook and an algebraic vector quantization (AVQ) method. This is also referred to as direct coding for short in embodiments of this application.

4. Reference quantization coding: Quantization coding is performed on an LPC parameter of a non-reference channel (which may also be referred to as a non-reference LPC parameter) based on an LPC parameter of a reference channel (which may also be referred to as a reference LPC parameter). In embodiments of this application, the LPC parameter of the non-reference channel and the LPC parameter of the reference channel share a same fixed codebook. A residual between the LPC parameter of the non-reference channel and the LPC parameter of the reference channel is encoded by using AVQ. This is also referred to as reference coding for short in embodiments of this application.

5. Multi-channel audio signal: In embodiments of this application, multi-channel refers to two or more channels. When a multi-channel audio signal includes only two channels, the multi-channel audio signal may also be referred to as a stereo audio signal. The multi-channel audio signal includes a stereo audio signal and an audio signal with three or more channels.

The term "and/or" in this application may be an association relationship for describing associated objects, and may indicate three relationships. For example, A and/or B may indicate the following cases: Only A exists, both A and B exist, and only B exists, where A and B may be singular or plural. In addition, the character "/" in this application generally indicates an "or" relationship between the associated objects. In this application, "at least one" means one or more, and "a plurality of" means two or more. At least one of the following items (pieces) or a similar expression thereof refers to any combination of these items, including any combination of singular items (pieces) or plural items (pieces). For example, at least one of a, b, or c may indicate: a, b, c, a and b, a and c, b and c, or a, b, and c, where a, b, and c may be singular or plural.

In the specification, claims, and accompanying drawings of this application, the terms "first", "second", and so on are intended to distinguish between similar objects but do not necessarily indicate a specific order or sequence. It should be understood that the terms used in such a way are interchangeable in proper circumstances, and this is merely a manner of distinguishing when objects having a same attribute are described in embodiments of this application. In addition, the terms "include", "contain" and any other variants mean to cover the non-exclusive inclusion, so that a process, method, system, product, or device that includes a series of units is not necessarily limited to those units, but may include other units not expressly listed or inherent to such a process, method, system, product, or device.

Audio signals such as multi-channel speech and music can often bring better experience to people. To facilitate efficient storage and transmission of audio signals, an audio encoder needs to compress the audio signals into bitstreams. However, when the audio encoder compresses the audio signals, it is necessary to balance a relationship between speech and music signal quality and a bit rate. Under a condition of a low bit rate, when a multi-channel audio signal is encoded, a case of insufficient bits usually occurs. This affects quality of audio signal coding. A coding algorithm based on linear prediction analysis is one of the most commonly used algorithms for audio signal coding. Refer to FIG. 1. FIG. 1 is a schematic diagram of a typical multi-channel audio coding framework based on linear prediction analysis.

A main principle of a coding algorithm based on linear prediction analysis is to solve an LPC parameter by using short-range dependence of audio signals, and then filter the audio signals by using a linear prediction filter, to effectively reduce a coding bit rate. The LPC parameter is a mathematical model parameter of the linear prediction filter, and is one of important parameters in coding. Coding and transmission of the LPC parameter occupy a specific bit rate. An LPC parameter coding method affects quality of audio signal coding. For LPC parameters of multiple channels or LPC parameters between multiple frames, a method of independent coding or reference coding may be used. A coding result of the LPC parameter is written into a coded bitstream. The coded bitstream may include a payload bitstream and a configuration bitstream. The payload bitstream may carry specific information of each frame of the audio signal, and the configuration bitstream may carry configuration information shared by all frames of the audio signal. The payload bitstream and the configuration bitstream may be independent of each other, or may be included in a same bitstream, that is, the payload bitstream and the configuration bitstream may be different parts in a same bitstream. The coded bitstream herein is actually a payload bitstream.

FIG. 1 shows a basic framework of a typical application of a linear prediction module in an audio encoder. A channel 1 to a channel N are N channels of an audio signal. This embodiment of this application relates to an LPC quantization coding part in a dashed box.

Figure 2A:
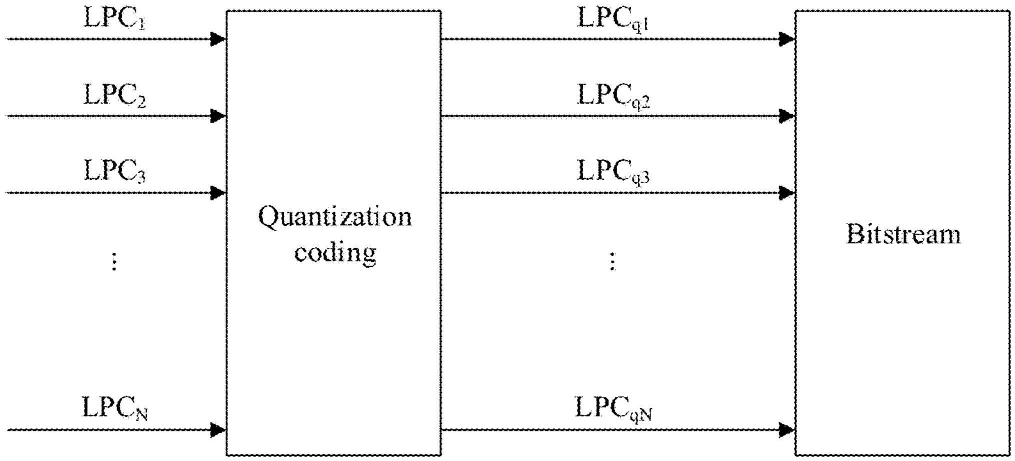
FIG. 2*a* is a schematic diagram of a direct quantization coding method for an LPC parameter of a multi-channel audio signal.

Refer to FIG. 2*a*. FIG. 2*a* is a schematic diagram of a direct quantization coding method for an LPC parameter of a multi-channel audio signal. In this method, direct quantization coding is performed on an LPC parameter of each channel in a multi-channel audio signal. Quantization coding of the channels is independent of each other, and redundant information exists between quantized LPC parameters of the channels. This results in a high bit rate occupied for direct quantization coding.

Figure 2B:
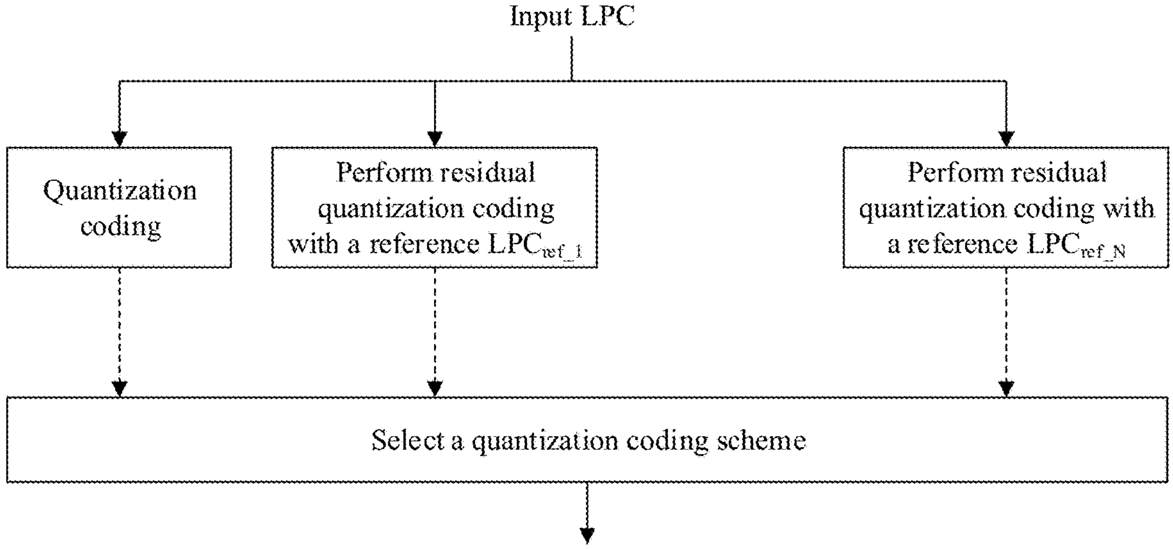
FIG. 2*b* is another schematic diagram of a reference quantization coding method for an LPC parameter of a multi-channel audio signal.

Refer to FIG. 2*b*. FIG. 2*b* is another schematic diagram of a reference quantization coding method for an LPC parameter of a multi-channel audio signal. In another linear prediction coding parameter coding method, a reference quantization coding method is used. When an LPC parameter of each channel in a multi-channel audio signal is encoded, a plurality of schemes in which coding is performed by using LPC parameters of other multiple channels as references need to be separately compared, to select a scheme with best coding effect for coding. When there are a large quantity of channels, a large amount of calculation is generated when the plurality of coding schemes are compared.

Figure 3A:
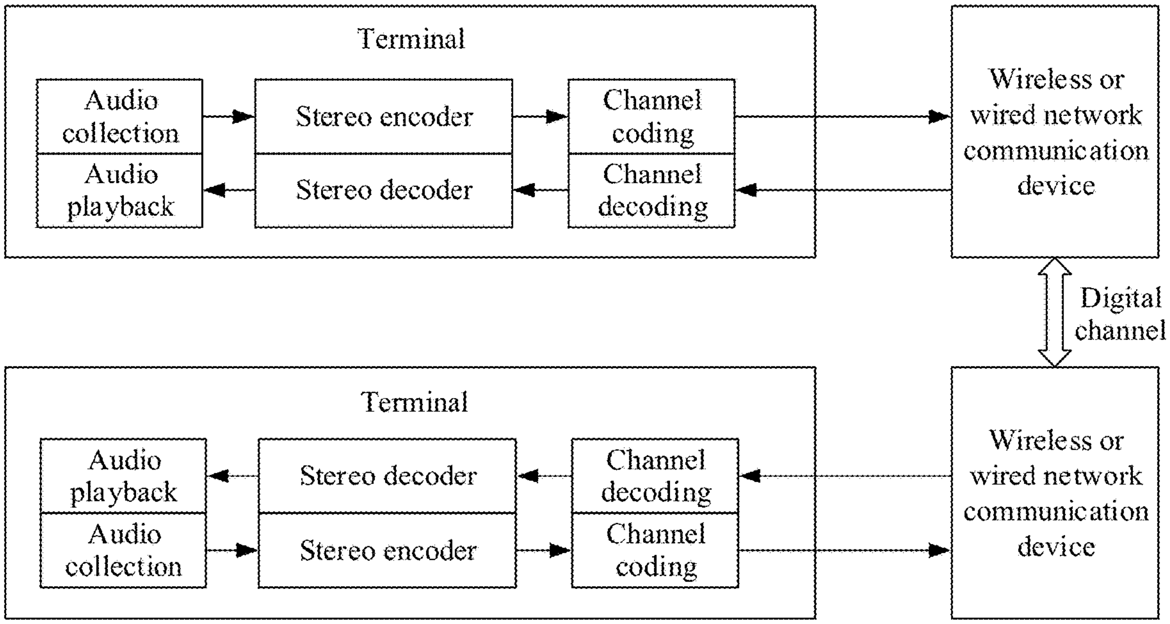
FIG. 3*a* is a schematic diagram of a system architecture applied on a terminal side according to an embodiment of this application.

Refer to FIG. 3*a*. FIG. 3*a* is a schematic diagram of a system architecture applied on a terminal side according to an embodiment of this application.

In audio communication, a terminal device at a transmit end performs stereo coding on a stereo audio signal collected by an audio acquisition module, performs channel coding, and then transmits a bitstream on a digital channel by using a wireless network or a core network. A terminal device at a receive end performs channel decoding based on the received signal, decodes the stereo audio signal by using a stereo decoder, and plays back the stereo audio signal by using an audio playback module in the terminal device at the receive end. The LPC parameter coding method provided in embodiments of this application may be applied to a terminal encoder and a terminal decoder.

Figure 3B:
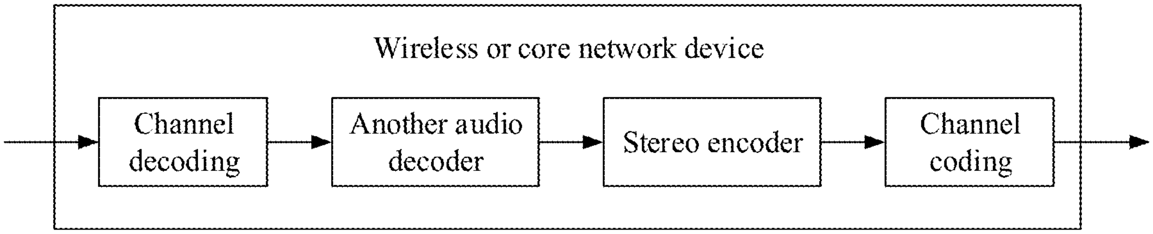
FIG. 3*b* is a schematic diagram of a system architecture applied on a wireless or core network side according to an embodiment of this application.
Figure 3C:
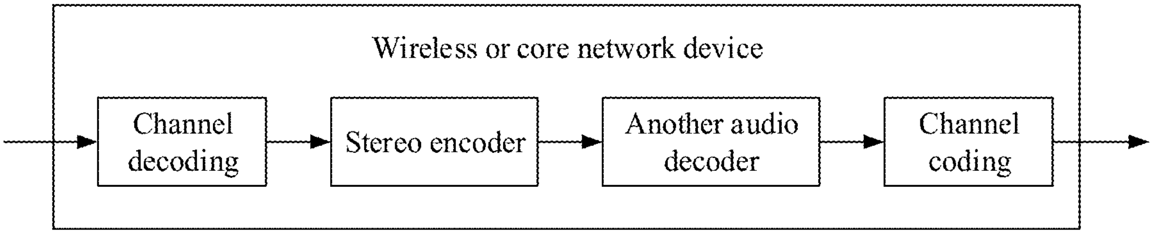
FIG. 3*c* is a schematic diagram of another system architecture applied on a wireless or core network side according to an embodiment of this application.

Refer to FIG. 3*b* and FIG. 3*c*. FIG. 3*b* and FIG. 3*c* each are a schematic diagram of a system architecture applied on a wireless or core network side according to an embodiment of this application.

In a wireless or a core network device, if transcoding needs to be implemented, corresponding stereo coding and decoding need to be performed.

Stereo coding and decoding may be a part of a multi-channel codec. For example, performing multi-channel coding on a collected multi-channel audio signal may be downmixing on the collected multi-channel audio signal to obtain a stereo audio signal, and coding the obtained stereo audio signal. A decoder side performs decoding based on a coded bitstream of the multi-channel audio signal and obtains the stereo audio signal, and restores the multi-channel audio signal after upmixing. Therefore, the LPC parameter coding method provided in embodiments of this application may also be applied to a multi-channel codec in a communication module of a terminal, a wireless network, or a core network.

Figure 3D:
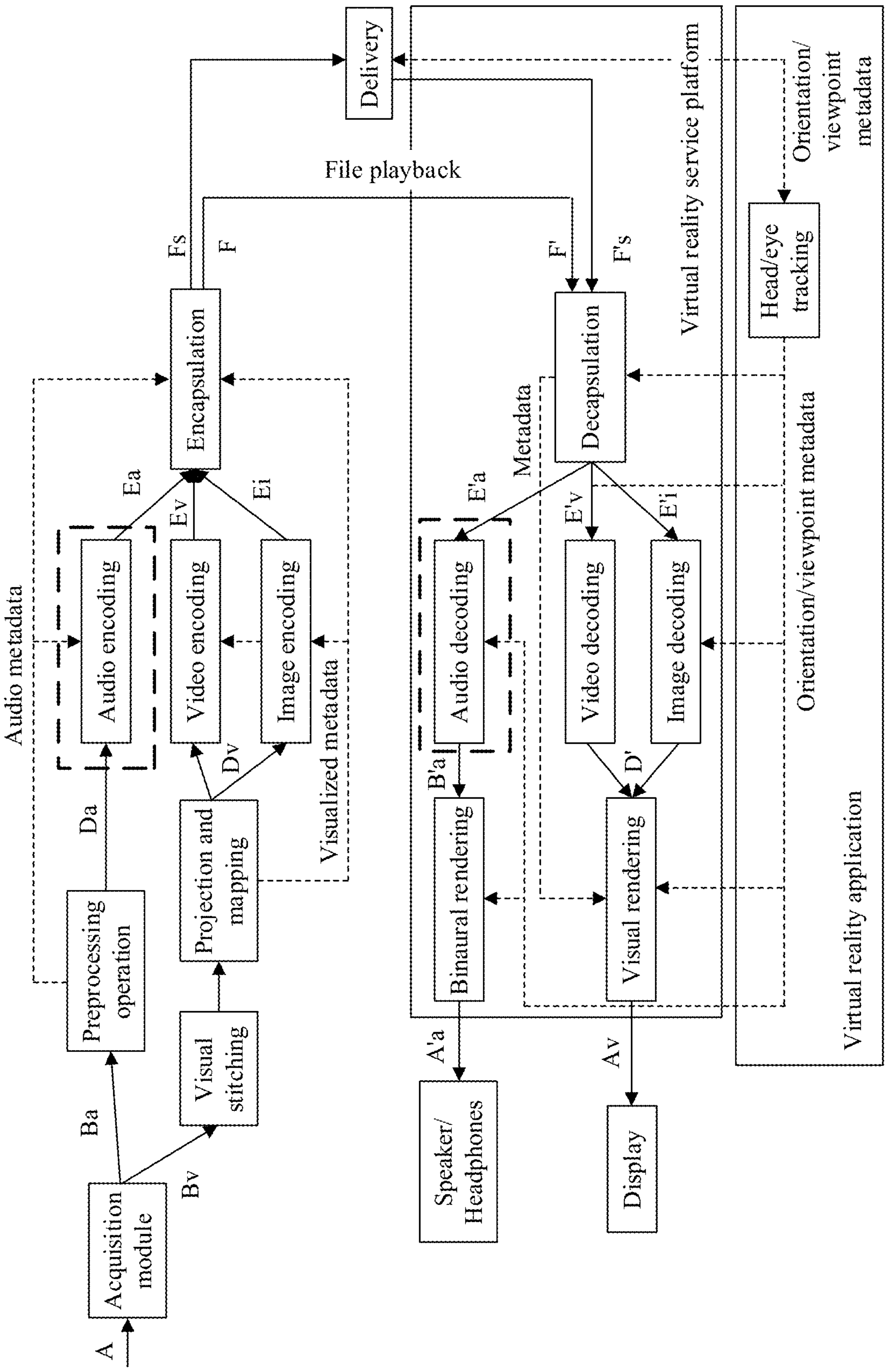
FIG. 3*d* is a schematic diagram of a system architecture of a VR streaming service according to an embodiment of this application.

Refer to FIG. 3*d*. FIG. 3*d* is a schematic diagram of a system architecture of a VR streaming service according to an embodiment of this application.

The LPC parameter coding method provided in embodiments of this application is further applicable to an audio encoding and decoding module in a VR streaming service.

As shown in a dashed box part in FIG. 3*d*, an end-to-end audio signal processing procedure is as follows: A preprocessing operation (audio preprocessing) is performed on an audio signal a after the audio signal a passes through an acquisition module. The preprocessing operation includes filtering out a low frequency part in the audio signal, and usually 20 Hz or 50 Hz is used as a demarcation point. Orientation information in the audio signal is extracted. After coding processing (audio encoding) and encapsulation (file/segment encapsulation), the audio signal is delivered to a decoder side. The decoder side performs decapsulation (file/segment decapsulation) and then decoding (audio decoding). Binaural rendering (audio rendering) is performed on the decoded signal, and the rendered audio signal is mapped to headphones of a listener. The headphones may be an independent headset, or may be earphones on glass devices such as a virtual reality head-mounted display (for example, HTC VIVE).

The linear prediction coding parameter coding method provided in embodiments of this application is applicable to a stereo audio signal, that is, a dual-channel audio signal, and a multi-channel audio signal. Descriptions are provided in the following with reference to specific embodiments.

Figure 4A:
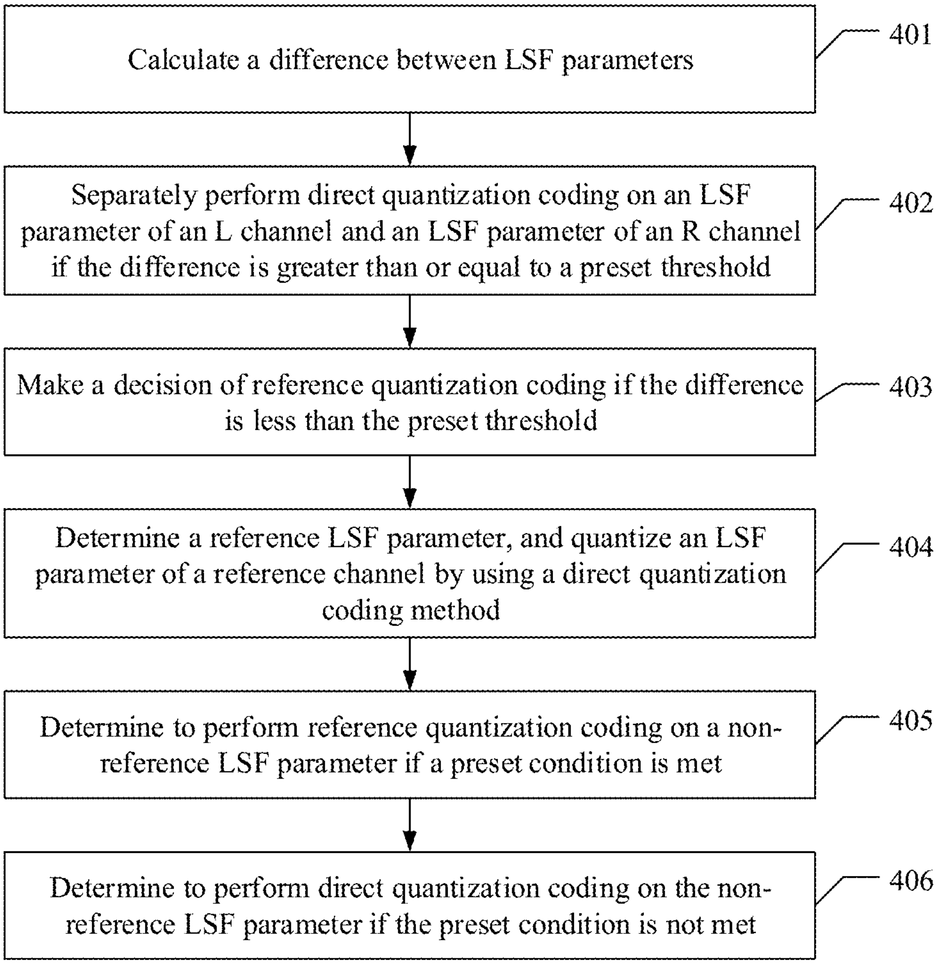
FIG. 4*a* is a schematic diagram of an embodiment of an LPC parameter coding method in embodiments of this application.

1. For an LSF parameter coding method for a stereo audio signal, refer to FIG. 4*a*. FIG. 4*a* is a schematic diagram of an embodiment of a linear prediction coding parameter coding method in embodiments of this application. The method specifically includes the following operations.

Operation 401: Calculate a difference between LSF parameters.

First, calculate a difference between an LSF parameter of an L channel and an LSF parameter of an R channel of a stereo audio signal. The difference may be a mean squared error, a cosine distance, or another metric that can represent a difference between LPC parameters. This is not specifically limited herein. Differences in this embodiment and the following embodiments are described by using a mean squared error as an example. A method for calculating a mean squared error of an LSF parameter is as follows:

$$DIFF_{LR} = \frac{1}{D}\sum_{d=0}^{D-1}(LSF_{(L,d)} - LSF_{(R,d)})^2 \tag{1}$$

$DIFF_{LR}$ represents the difference between the LSF parameter of the L channel and the LSF parameter of the R channel, $LSF_{(L,d)}$ represents the LSF parameter of the L channel, where d=0, . . . D−1, $LSF_{(R,d)}$ represents the LSF parameter of the R channel, where d=0, . . . , D−1, and D is a dimension of the LSF parameter. In an embodiment, in this embodiment, D=16 is used.

Then, determine whether the difference between the LSF parameter of the L channel and the LSF parameter of the R channel is less than a preset threshold. If yes, perform operation 403. If no, perform operation 402. The preset threshold α is an empirical constant. In an embodiment, a value range of α is (0,2000], for example, 1000, 1500, or 2000. A specific value is not limited herein. In an embodiment, the determining condition may alternatively be: determining whether the difference between the LSF parameter of the L channel and the LSF parameter of the R channel is less than or equal to a preset threshold. If yes, perform operation 403, if no, perform operation 402.

Operation 402: Separately perform direct quantization coding on the LSF parameter of the L channel and the LSF parameter of the R channel if the difference is greater than or equal to the preset threshold.

If the condition is not met, direct quantization coding results of the LSF parameters of the L channel and the R channel are written into a coded bitstream. Direct quantization coding uses a pre-specified codebook and a pre-specified AVQ method for performing quantization coding on the LSF parameters. The direct quantization coding results obtained by separately performing direct quantization coding on the LSF parameter of the L channel and the LSF parameter of the R channel are written into the coded bitstream. It is a conventional technology to perform quantization coding on an LSF parameter by using a pre-specified codebook and a pre-specified AVQ. Specific operations are not described in detail in this application.

Operation 403: Make a decision of reference quantization coding if the difference is less than the preset threshold.

If $DIFF_{LR}<\alpha$, it is determined to start a process of reference coding decision on the LSF parameters of the L channel and the R channel. Specifically, operation 404 to operation 406 are included.

Operation 404: Determine a reference LSF parameter, and quantize the reference LSF parameter by using a direct quantization coding method.

First, determine the reference LSF parameter from the LSF parameter of the L channel and the LSF parameter of the R channel. A channel corresponding to the reference LSF parameter may be referred to as a reference channel, and a channel corresponding to a non-reference LSF parameter may be referred to as a non-reference channel.

There are a plurality of methods for determining the reference LSF parameter. In an embodiment, an LSF parameter of a channel is randomly selected as the reference LSF parameter. In an embodiment, an LSF parameter of a preset channel is determined as the reference LSF parameter. In an embodiment, quantities of bits required for direct quantization coding of the LSF parameters of the left and right channels are calculated. An LSF parameter of a channel with a smaller quantity of bits is selected as the reference LSF parameter and is denoted as $LSF_{reference}$, and the channel is referred to as the reference channel. Because a quantity of bits for coding different LSF parameters by using AVQ varies, selecting an LSF parameter of a channel that requires a smaller quantity of bits as the reference LSF parameter can reduce the quantity of bits.

Then, the LSF parameter of the reference channel is quantized by using the direct quantization coding method. A direct coding result of the reference LSF parameter is denoted as $LSF_{reference\_Q}$, and is written into the coded bitstream.

Operation 405: Determine to perform reference quantization coding on the non-reference LSF parameter if the preset condition is met.

Direct quantization coding and reference quantization coding are separately performed on the LSF parameter of the non-reference channel, to obtain quantities of bits and distortion of the two quantization coding schemes. The distortion of direct quantization coding is distortion of a direct coding result relative to an LPC parameter, and the distortion of reference quantization coding is distortion of a residual coding result relative to an LPC parameter. Then, the distortion and the quantities of bits of the foregoing two quantization coding schemes are compared. A quantization coding scheme to be used is determined based on the distortion and the quantities of bits for coding, that is, reference coding is determined.

Determine to perform reference quantization coding on the non-reference channel if the preset condition is met. If the preset condition is not met, perform operation 406.

There may be a plurality of preset conditions. In an embodiment, if the distortion of the reference quantization coding is less than a first preset threshold, it is determined that reference quantization coding is used for the non-reference channel. In an embodiment, if the quantity of bits required for reference quantization coding is less than a second preset threshold, it is determined that reference quantization coding is used for the non-reference channel. In an embodiment, if the distortion of reference quantization coding is lower than the distortion of direct quantization coding, and a difference between the distortion of reference quantization coding and the distortion of direct quantization coding is greater than or equal to a third preset threshold, it is determined that reference quantization coding is used for the non-reference channel. In an embodiment, if the quantity of bit required for reference quantization coding is less than the quantity of bits required for direct quantization coding, and a difference between the quantity of bit required for reference quantization coding and the quantity of bits required for direct quantization coding is greater than or equal to a fourth preset threshold, it is determined that reference quantization coding is used for the non-reference channel. In an embodiment, if the distortion of reference quantization coding is lower than a fifth preset threshold, and the quantity of bits required is less than a sixth preset threshold, it is determined that reference quantization coding is used for the non-reference channel. In an embodiment, if the distortion of the reference quantization coding is lower than the distortion of direct quantization coding, a difference between the distortion is greater than or equal to a seventh preset threshold, the quantity of bits required for reference quantization coding is less than the quantity of bits required for direct quantization coding, and a difference between the quantities of bits is greater than or equal to an eighth preset threshold, it is determined that reference quantization coding is used for the non-reference channel.

Specific content of the preset condition is not limited herein. It should be noted that numerical values of the first preset threshold, the second preset threshold, the third preset threshold, the fourth preset threshold, the fifth preset threshold, the sixth preset threshold, the seventh preset threshold, and the eighth preset threshold herein may be the same or different, and specific numerical values thereof are not limited.

Specifically, the quantities of bits and the quantization distortion of direct quantization coding and reference quantization coding that are separately performed on the LSF parameter of the non-reference channel are determined.

(1) Quantity of bits required for direct quantization coding: A method for performing direct quantization coding on an LSF parameter of a non-reference channel is the same as a method for performing direct quantization coding on an LSF parameter of a reference channel. The quantity of bits required for performing direct quantization coding on the LSF parameter of the non-reference channel may be obtained based on the quantity of bits required for performing direct quantization coding on the LSF parameter of the reference channel.

(2) Quantity of bits required for reference quantization coding: For calculation of the quantity of bits required for performing reference quantization coding on the LSF parameter of the non-reference channel, a residual between the LSF parameter and the reference LSF parameter is first calculated, and then quantization coding is performed on the residual parameter $LSF_{res}$ by using the AVQ method.

The residual is calculated as follows:

$$LSF_{res}=LSF-LSF_{reference} \tag{2}$$

It is a conventional technology to perform quantization coding on the residual parameter $LSF_{res}$ by using the AVQ method, and a quantization result is represented as $LSF_{res\_Q}$. Specific operations are not described in detail in this embodiment of this application.

A reference quantization result of the non-reference channel is expressed as follows:

$$LSF_{ref\_Q}=LSF_{res\_Q}+LSF_{reference\_Q} \tag{3}$$

After quantization coding, the quantity of bits required for performing reference quantization coding on the LSF parameter of the non-reference channel is also obtained.

(3) Distortion of direct quantization coding:

$$\text{Distortion} = \frac{1}{D}\sum_{d=0}^{D-1}(LSF_d - LSF_{(Q,d)})^2 \tag{4}$$

(4) Distortion of reference quantization coding:

$$\text{Distortion}_{ref} = \frac{1}{D}\sum_{d=0}^{D-1}(LSF_d - LSF_{(ref\_Q,d)})^2 \tag{5}$$

Distortion herein is distortion of direct quantization, that is, distortion of a direct coding result of a non-reference LPC parameter relative to the non-reference LPC parameter. $\text{Distortion}_{ref}$ is distortion of reference quantization, that is, distortion of a residual coding result of the non-reference LPC parameter relative to the non-reference LPC parameter. $LSF_{(Q,d)}$, d=0, . . . , D−1 is a direct quantization coding result of an LSF parameter of the other channel, $LSF_{(ref\_Q,d)}$, d=0, . . . , D−1 is a reference quantization coding result of the LSF parameter of the other channel, $LSF_d$, d=0, . . . , D−1 is the LSF parameter of the other channel, and D is a dimension of the LSF parameter.

In an embodiment, if the condition for enabling the reference quantization coding mode is satisfied, a value of a reference quantization coding flag is set to 1. Otherwise, the value of the reference quantization coding flag is set to 0. If the value of the reference quantization coding flag is set to 1, it indicates that the quantization scheme of the LSF parameter of the other channel is reference quantization coding. If the value of the reference quantization coding flag is set to 0, it indicates that the quantization scheme of the LSF parameter of the other channel is direct quantization coding. The reference quantization coding flag is written into the coded bitstream. When the value of the reference quantization coding flag is 1, information about a channel number corresponding to the reference LSF parameter is also written into the coded bitstream, and a quantity of bits occupied by the reference quantization coding flag varies with a quantity of channels. In this embodiment, there are only the L channel and the R channel. Therefore, the channel number corresponding to the reference LSF parameter may be represented with 1 bit.

If the reference quantization coding mode is enabled, reference quantization coding is performed on the LSF parameter of the other channel, that is, a residual coding result obtained after quantization coding is performed on the residual parameter $LSF_{res}$ by using the AVQ method is written into the coded bitstream. Otherwise, a direct coding result obtained after direct quantization coding is performed on the LSF parameter of the other channel is written into the coded bitstream.

Operation 406: Determine to perform direct quantization coding on the non-reference LSF parameter if the preset condition is not met.

A process of direct quantization coding is not described herein again. A direct coding result of the non-reference LSF parameter is written into the coded bitstream.

A difference between this embodiment of this application and the conventional technology lies in that, based on a difference between LSF parameters of channels, a difference between LSF parameters of two channels is calculated to determine whether to enter a process of reference quantization coding, and whether to enable a reference mode is determined in the process of the reference quantization coding mode.

Figure 4B:
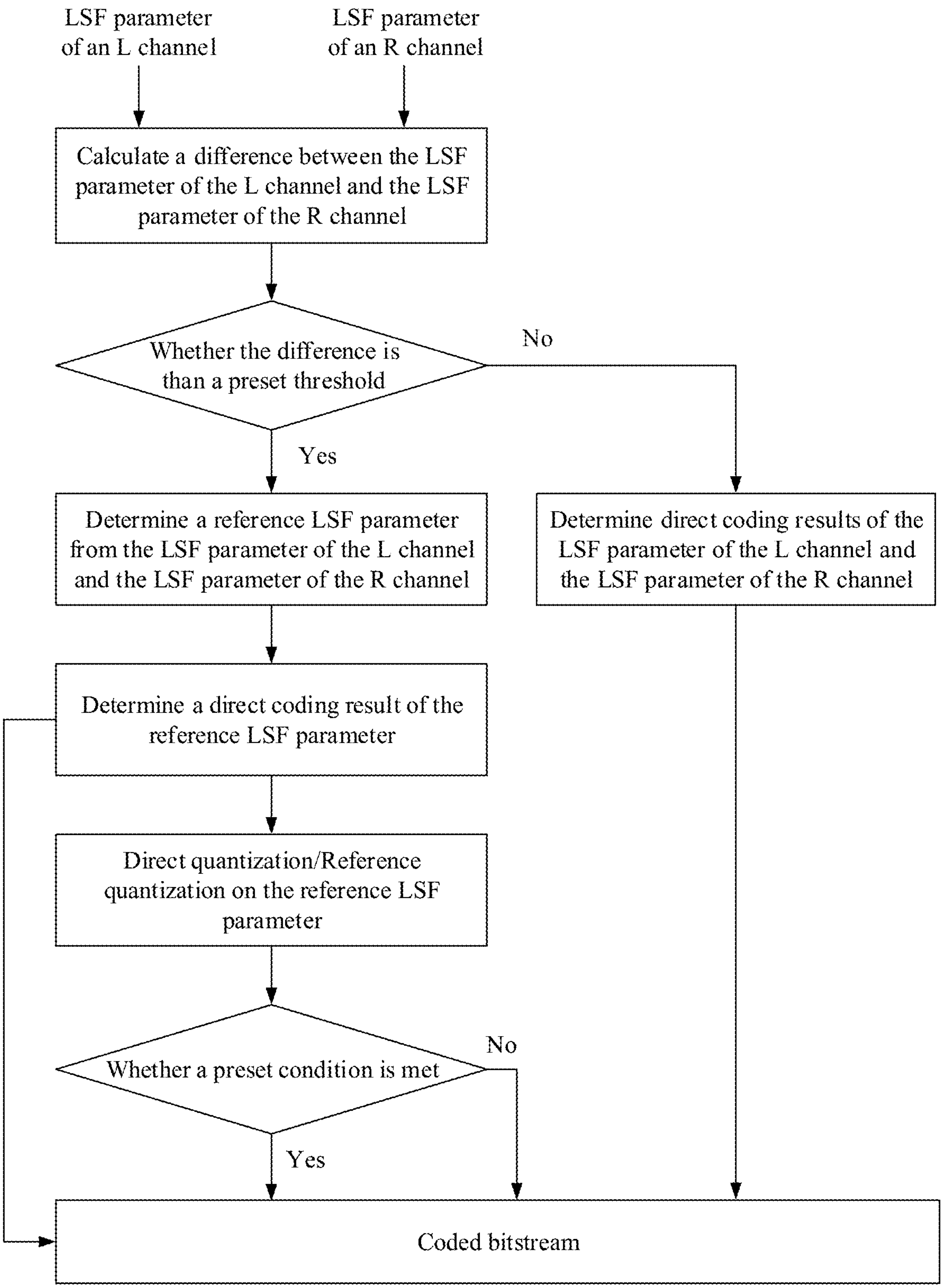
FIG. 4*b* is a schematic diagram of another embodiment of an LPC parameter coding method in embodiments of this application.

Refer to FIG. 4*b*. FIG. 4*b* is a schematic diagram of another embodiment of an LPC parameter coding method in embodiments of this application. A difference between an LSF parameter of an L channel and an LSF parameter of an R channel is first calculated, and whether the difference is less than a preset threshold is determined. If no, perform direct quantization coding on the LSF parameter of the L channel and the LSF parameter of the R channel, determine direct coding results of the LSF parameter of the L channel and the LSF parameter of the R channel, and write the direct coding results into a coded bitstream. If yes, determine a reference LSF parameter from the LSF parameter of the L channel and the LSF parameter of the R channel, perform direct quantization coding on the reference LSF parameter, and write a direct coding result into the coded bitstream. Then, determine a coding scheme of the non-reference LSF parameter. Specifically, direct quantization may be performed on the non-reference LSF parameter, and reference quantization is performed on the non-reference LSF parameter. A difference between the two quantization coding schemes is compared, to determine whether a preset condition is met. For specific content of the preset condition, refer to operation 405. Details are not described herein again. If the preset condition is met, perform reference quantization coding on the non-reference LSF parameter, and write a residual coding result of the non-reference LSF parameter into the coded bitstream. If the preset condition is not met, perform direct quantization coding on the non-reference LSF parameter, and write a direct coding result of the non-reference LSF parameter into the coded bitstream.

In this embodiment, whether the LSF parameters of the two channels enter the process of reference quantization coding is determined by calculating the difference between the LSF parameters of the two channels. This can reduce an amount of calculation for determining the process of reference coding. Enabling the reference quantization coding mode reduces coding redundancy of the LSF parameters, reduces consumption of coding bits while ensuring coding distortion, and significantly improves an objective score in the audio coding mode with a low bit rate.

Figure 5:
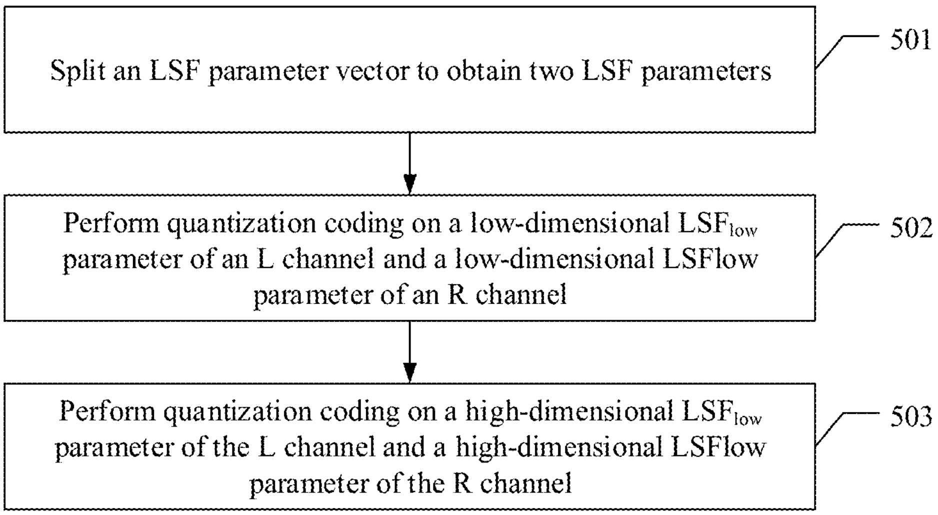
FIG. 5 is a schematic diagram of still another embodiment of an LPC parameter coding method in embodiments of this application.

2. For another LSF parameter coding method for a stereo audio signal, refer to FIG. 5. FIG. 5 is a schematic diagram of still another embodiment of a linear prediction coding parameter coding method in embodiments of this application. The method specifically includes the following operations.

Operation 501: Split an LSF parameter vector to obtain two LSF parameters.

First, LSF parameter vectors of L and R channels of a stereo audio signal are split into two LSF parameters in high and low dimensions, and the two LSF parameters are denoted as $LSF_{low}$ and $LSF_{high}$. In this embodiment of this application, to distinguish an LSF parameter before and after splitting, an LSF parameter before splitting may be referred to as an original LSF parameter, and $LSF_{low}$ and $LSF_{high}$ after splitting may be referred to as to-be-coded LSF parameters. In an embodiment, $LSF_{low}$ is obtained by truncating 0 to D/2−1 dimensions of the original LSF parameter, $LSF_{high}$ is obtained by truncating D/2 to D−1 dimensions of the original LSF parameter, and D is a dimension of the LSF parameter.

The low-dimensional $LSF_{low}$ parameter and the high-dimensional $LSF_{high}$ parameter of the L channel and the low-dimensional $LSF_{low}$ parameter and the high-dimensional $LSF_{high}$ parameter of the R channel are obtained.

Operation 502. Perform quantization coding on the low-dimensional $LSF_{low}$ parameter of the L channel and the low-dimensional $LSF_{low}$ parameter of the R channel.

Refer to the method in the embodiment corresponding to FIG. 4*a*. Details are not described herein again.

Operation 503. Perform quantization coding on the high-dimensional $LSF_{high}$ parameter of the L channel and the high-dimensional $LSF_{high}$ parameter of the R channel.

For a specific method for performing quantization coding on the high-dimensional $LSF_{high}$ parameter of the L channel and the high-dimensional $LSF_{high}$ parameter of the R channel, refer to the embodiment corresponding to FIG. 4*a*. Details are not described herein again.

First, an LSF parameter on which quantization coding is to be performed is split. For a D-dimensional LSF parameter, splitting processing may be used to process different segments by using different quantization policies. This further improves quantization efficiency.

Figure 6:
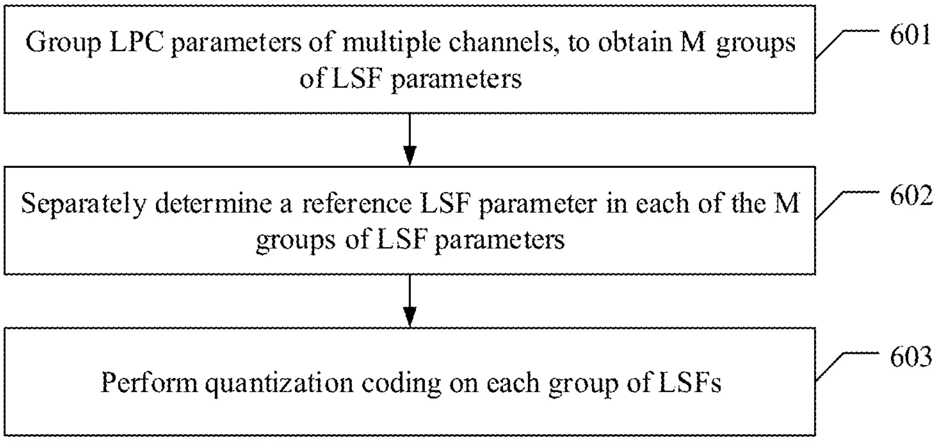
FIG. 6 is a schematic diagram of yet another embodiment of an LPC parameter coding method in embodiments of this application.

3. For an LSF parameter coding method for a multi-channel audio signal, refer to FIG. 6. FIG. 6 is a schematic diagram of yet another embodiment of an LPC parameter coding method in embodiments of this application. The method specifically includes the following operations.

For multi-channel audio, in a solution of dividing LSF parameters of the multiple channels into M groups according to a preset rule, LSF parameters in each group are coded respectively. In an embodiment, a quantity of channels of the audio signal is greater than or equal to 4, and M is greater than or equal to 2.

Operation 601: Group LPC parameters of multiple channels, to obtain M groups of LSF parameters.

A grouping module for LPC parameters of multiple channels first groups input LSF parameters of multiple channels according to a preset rule, and obtains M groups of LSF parameters after grouping. Each group of LSF parameters may be referred to as an LSF parameter group. In an embodiment, the preset rule may be: fixed grouping based on a channel sequence, grouping based on a position of a nearby speaker corresponding to a channel, or another rule. This is not specifically limited herein. It should be noted that quantities of parameters in all LSF parameter groups may be the same or may be different. This is not specifically limited herein.

For example, it is assumed that a total quantity N of the LSF parameters of the multiple channels is equal to 6, and a quantity M of groups is equal to 3. The preset rule is that quantities of channels in all groups are consistent. That is, a channel 1 and a channel 2 are grouped into one group, a channel 3 and a channel 4 are grouped into one group, and a channel 5 and a channel 6 are grouped into another group.

It is assumed that a total quantity N of the LSF parameters of the multiple channels is equal to 6, a quantity M of groups is equal to 2. The preset rule is that channels 1 to N/2 are grouped into one group, and channels N/2+1 to N are grouped into another group. That is, a channel 1, a channel 2, and a channel 3 form one group, and a channel 4, a channel 5, and a channel 6 form another group.

It should be noted that, after the M LSF parameter groups are obtained, each LSF parameter group may be separately coded. For an LSF parameter group with two LSF parameters, refer to the coding method in Embodiment 1 or Embodiment 2 for coding. coding methods for a plurality of LSF parameter groups may be the same or may be different. This is not specifically limited herein. The following specifically describes a parameter group coding method for an LSF parameter group with three or more than three LSF parameters.

Operation 602: Separately determine a reference LSF parameter in each of the M groups of LSF parameters.

There are a plurality of methods for determining the reference LSF parameter from each group of LSF parameters. It is assumed that one group of LSF parameters has c LSF parameters, and c is a constant. In an embodiment, if c=2, for a method for selecting the reference LSF parameter, refer to the method described in the embodiment corresponding to FIG. 4*a*.

In an embodiment, if c>2, a method for selecting the reference LSF parameter is:

First, an average difference between the $j^{th}$ LSF parameter in the group and other LSF parameters of other channels in the group is calculated as follows:

$$\text{AVG\_DIFF}_j = \frac{1}{c-1}\sum_{1\le k\le c, k\ne j}\sum_{d=0}^{D-1}(LSF_{(j,d)} - LSF_{(k,d)})^2 \quad j\in[1,c] \tag{6}$$

D is a dimension of the LSF parameter, $LSF_{(j,d)}$, d=0, . . . , D−1 is the $j^{th}$ LSF parameter in the group, $LSF_{(k,d)}$, d=0, . . . , D−1, and 1≤k≤c, k≠j is the $k^{th}$ LSF parameter other than the $j^{th}$ LSF parameter in the group.

Then, a channel number r of the reference LSF parameter is obtained based on a principle of minimum average difference between a channel and other channels:

$$r = \underset{1\le j\le c}{\text{argmin}}\,\text{AVG\_DIFF}_j \tag{7}$$

$\text{AVG\_DIFF}_j$ herein represents an average difference between the LSF parameter of the $j^{th}$ channel in the group and the LSF parameters of other channels in the group, and r represents the channel number corresponding to the reference LSF parameter.

Operation 603: Perform quantization coding on each group of LSF parameters.

After the reference LSF parameter of each group of LSF parameters is determined, quantization coding may be separately performed on each group of LSF parameters. In an embodiment, direct quantization coding is performed on the reference LSF parameter, and reference coding is performed on a non-reference LSF parameter. In an embodiment, direct quantization coding is performed on the reference LSF parameter, and reference coding is performed on the non-reference LSF parameter when a preset condition is met. For details about the preset condition, refer to operation 405 in the embodiment corresponding to FIG. 4*a*. Details are not described herein again.

The LPC parameters of the multiple channels are grouped according to the preset rule. If a group has more than two LPC parameters, a reference LPC parameter in each group is selected based on the principle of minimum average difference.

When a group has a large quantity of LPC parameters, selecting a reference LPC parameter from the LPC parameters based on the principle of minimum average difference can improve efficiency, and performing quantization on LPC parameter of other channels in the group by using the selected reference LPC parameter can be ensured. Fewer bits are used.

Figure 7:
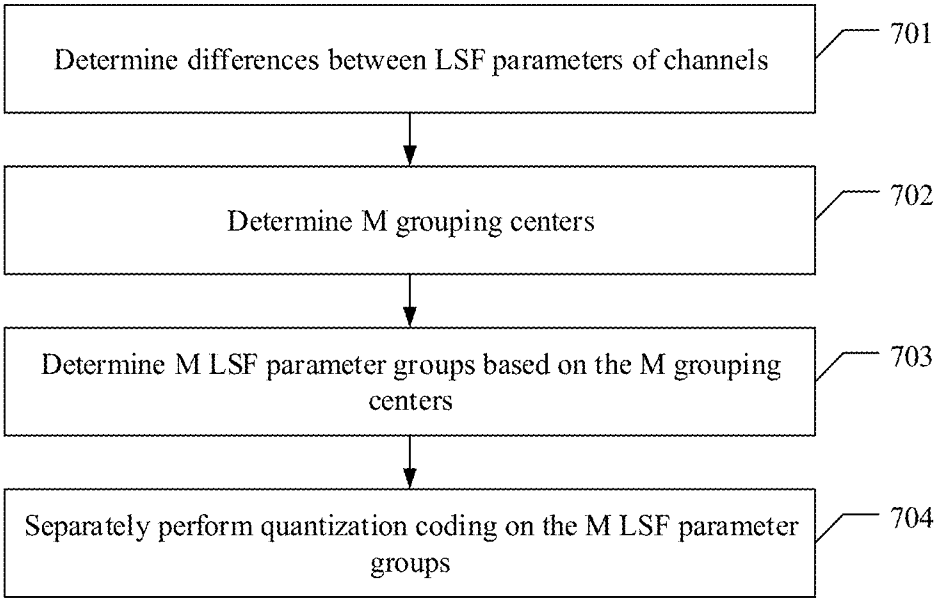
FIG. 7 is a schematic diagram of still yet another embodiment of an LPC parameter coding method in embodiments of this application.

4. For an LSF parameter coding method for a multichannel audio signal, refer to FIG. 7. FIG. 7 is a schematic diagram of still yet another embodiment of an LPC parameter coding method in embodiments of this application. The method specifically includes the following operations.

There are a plurality of methods for grouping LSF parameters of N channels into M groups. Specifically, grouping may be performed based on the LSF parameters by using a clustering method. A possible grouping manner is described in this embodiment of this application. Specific description is provided below.

Operation 701: Determine differences between LSF parameters of channels.

First, the differences between the LSF parameters of the channels are calculated. The differences between the LSF parameters of the channels include a difference between any two LSF parameters, and the difference includes a mean squared error, a cosine distance, or the like. For example, a difference between LSF parameters of a channel i and a channel j is:

$$DIFF_{(i,j)} = \frac{1}{D}\sum_{d=0}^{D-1}(LSF_{(i,d)} - LSF_{(j,d)})^2 \quad i\ne j \quad i,j\in[1,N] \tag{8}$$

$DIFF_{(i,j)}$ is the difference between the LSF parameters of the channel i and the channel j, and D is a dimension of the LSF parameter.

Operation 702: Determine M grouping centers.

The M grouping centers are determined based on the differences between the LSF parameters of the channels. A grouping center may also be referred to as a clustering center of an LSF parameter group. There are a plurality of manners of obtaining the clustering center. This is not specifically limited herein.

In an embodiment, an average value of absolute values of differences between any M LPC parameters is calculated, and M LPC parameters with a maximum average value are used as the M grouping centers. The differences between the M LPC parameters are a set of differences between any two of the M LPC parameters, and the average value of the absolute values of the differences between the M LPC parameters is an average value of absolute values of M×(M−1)/2 difference values.

In an embodiment, an initial grouping center is obtained. For example, find a maximum value among all obtained $DIFF_{(i,j)}$. Two grouping centers $LSF_{centre\_1}$ and $LSF_{centre\_2}$ are obtained based on two LSF parameters corresponding to the maximum value, and then the M grouping centers are obtained based on the initial grouping center.

For example, an LSF parameter that differs most from the existing grouping centers is selected from LSF parameters of other channels other than the existing grouping center as a new grouping center $LSF_{centre\_m}$, where 2<m≤M. A selection method is as follows:

$$m = \underset{1\le k\le n_{remain}}{\text{argmax}} \sum_{l=1}^{m-1}\sum_{d=0}^{D-1}(LSF_{(k,d)} - LSF_{(centre\_l,d)})^2 \quad (9)$$

$n_{remain}$ is a quantity of LSF parameters other than the LSF parameter of the existing grouping center, and m is a channel number corresponding to the new grouping center $LSF_{centre\_m}$.

This operation is iterated until m=M, that is, the M grouping centers are found.

Operation 703: Determine M LSF parameter groups based on the M grouping centers.

Clustering is performed on the LSF parameters based on the M grouping centers, and the M LSF parameter groups are determined by using a clustering algorithm.

In an embodiment, remaining LSF parameters except the grouping center are separately grouped into the M groups based on a principle of minimum difference. A method is as follows:

$$s = \underset{1\le m\le M}{\text{argmin}}\left(\sum_{d=0}^{D-1}\left(LSF_{(remain,d)} - LSF_{(centre_m,d)}\right)^2\right) \quad (10)$$

$LSF_{remain}$ herein represents any LSF parameter other than the LSF parameter of the grouping center selected in the foregoing operation. s is a group identifier of a group selected for $LSF_{remain}$.

Through the foregoing operations, the LSF parameters of the N channels may be grouped into the M groups.

Operation 704. Separately perform quantization coding on the M LSF parameter groups.

After grouping is completed, a method and other procedures for selecting a reference LSF parameter from each LSF parameter group are the same as those in Embodiment 3. Details are not described herein again.

This embodiment provides a new method for grouping LPC parameters of multiple channels. A better grouping result can be obtained and quantization efficiency can be further improved by using the method for grouping LPC parameter of multiple channels.

5. Another LSF parameter coding method for a multi-channel audio signal is provided.

For an LSF parameter of a multi-channel audio signal, LSF parameter splitting may also be considered in coding method.

First, an original LSF parameter vector of each channel is split into a high-dimensional LSF parameter and a low-dimensional LSF parameter in high and low dimensions. The high-dimensional LSF parameter and the low-dimensional LSF parameter are denoted as $LSF_{low}$ and $LSF_{high}$ respectively. A method for generating $LSF_{low}$ and $LSF_{high}$ is consistent with the method in Embodiment 2. Then, quantization coding is performed on $LSF_{low}$ and $LSF_{high}$ of each channel according to the process in Embodiment 3 or Embodiment 4.

For a multi-dimensional LSF parameter, splitting processing may be used to process different segments by using different quantization policies. This further improves quantization efficiency, and optimizes coding effect.

Figure 8:
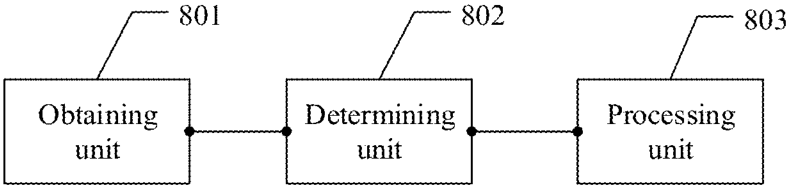
FIG. 8 is a schematic diagram of an embodiment of a coding apparatus in embodiments of this application.

The LPC parameter coding methods are described in the foregoing embodiments. The following describes an apparatus for implementing the methods. FIG. 8 is a schematic diagram of an embodiment of a coding apparatus in embodiments of this application.

An embodiment of this application provides a coding apparatus. The coding apparatus may be a terminal, may be a communication module of a terminal, a wireless network, or a core network, or may be a terminal encoder, a terminal decoder, a multi-channel codec of a communication module of a terminal, a wireless network, or a core network, or the like. This is not specifically limited herein.

The coding apparatus includes:

an obtaining unit 801, configured to obtain to-be-coded LPC parameters of at least two channels of an audio signal;

a determining unit 802, configured to determine a reference LPC parameter from the to-be-coded LPC parameters of the at least two channels, where an LPC parameter other than the reference LPC parameter in the to-be-coded LPC parameters of the at least two channels is a non-reference LPC parameter, where the obtaining unit 801 is further configured to obtain a direct coding result of the reference LPC parameter;

the determining unit 802 is further configured to determine a residual of the non-reference LPC parameter based on the reference LPC parameter; and the determining unit 802 is further configured to determine a residual coding result of the non-reference LPC parameter based on the direct coding result of the reference LPC parameter and the residual; and a processing unit 803, configured to write the direct coding result of the reference LPC parameter and the residual coding result of the non-reference LPC parameter into a coded bitstream.

In an embodiment, the determining unit 802 is specifically configured to:

determine an LPC parameter that is in the to-be-coded LPC parameters of the at least two channels and that requires a minimum quantity of bits for direct quantization coding as the reference LPC parameter.

In an embodiment, the to-be-coded LPC parameters of the at least two channels include to-be-coded LPC parameters of at least three channels.

The obtaining unit 801 is specifically configured to:

obtain an absolute value of a difference between each LPC parameter in the to-be-coded LPC parameters of the at least three channels and another LPC parameter; and obtain an average value of absolute values of differences between each LPC parameter and other LPC parameters.

The determining unit 802 is specifically configured to:

determine an LPC parameter that is in the LPC parameters and that has a minimum average value of the absolute values of the differences as the reference LPC parameter.

In an embodiment, the difference includes a mean squared error or a cosine distance.

In an embodiment, the audio signal includes a plurality of channels.

The determining unit 802 is further configured to:

determine a plurality of parameter groups by grouping to-be-coded LPC parameters of the plurality of channels of the audio signal, where one of the plurality of parameter groups includes the to-be-coded LPC parameters of the at least two channels, and the LPC parameters in the plurality of parameter groups have no intersection.

In an embodiment, the determining unit 802 is specifically configured to:

determine the plurality of parameter groups based on channel numbers of the plurality of channels of the audio signal; or determine the plurality of parameter groups based on a position of a speaker corresponding to each of the plurality of channels of the audio signal.

In an embodiment, the determining unit 802 is specifically configured to:

cluster the to-be-coded LPC parameters of the plurality of channels of the audio signal, to determine the plurality of parameter groups.

In an embodiment, the determining unit 802 is specifically configured to:

determine M LPC parameters from the to-be-coded LPC parameters of the plurality of channels, where an average value of absolute values of differences between the M LPC parameters is greater than or equal to an average value of absolute values of differences between any M LPC parameters in the LPC parameters of the plurality of channels, the M LPC parameters are clustering centers of M parameter groups, and M is a preset value; and perform clustering based on the M clustering centers, to determine the M parameter groups, where an absolute value of a difference between a first LPC parameter and a second LPC parameter in a first parameter group in the M parameter groups is less than an absolute value of a difference between the first LPC parameter and a third LPC parameter, the second LPC parameter is a clustering center of the first parameter group, the third LPC parameter is a clustering center of a second parameter group, and the first parameter group and the second parameter group are any two different parameter groups in the M parameter groups.

In an embodiment, the obtaining unit 801 is specifically configured to:

split original LPC parameters of the at least two channels of the audio signal, to obtain a high-dimensional LPC parameter group and a low-dimensional LPC parameter group, where the high-dimensional LPC parameter group includes the to-be-coded LPC parameters of the at least two channels, or the low-dimensional LPC parameter group includes the to-be-coded LPC parameters of the at least two channels.

In an embodiment, the audio signal includes a plurality of channels.

The obtaining unit 801 is specifically configured to:

split original LPC parameters of the plurality of channels of the audio signal, to obtain a high-dimensional LPC parameter group and a low-dimensional LPC parameter group; and obtain a plurality of high-dimensional parameter groups by grouping LPC parameters in the high-dimensional LPC parameter group, where one of the plurality of high-dimensional parameter groups includes the to-be-coded LPC parameters of the at least two channels, and LPC parameters in the plurality of high-dimensional parameter groups have no intersection; or obtain a plurality of low-dimensional parameter groups by grouping LPC parameters in the low-dimensional LPC parameter group, where one of the plurality of low-dimensional parameter groups includes the to-be-coded LPC parameters of the at least two channels, and LPC parameters in the plurality of low-dimensional parameter groups have no intersection.

In an embodiment, the determining unit 802 is further configured to:

determine that an absolute value of a difference between LPC parameters of every two channels in the at least two channels is less than or equal to a preset threshold, where the difference between the LPC parameters of the two channels includes an average value of mean squared errors or an average value of cosine distances between the LPC parameters of the two channels.

In an embodiment, the obtaining unit 801 is further configured to:

obtain a direct coding result of the non-reference LPC parameter.

The determining unit 802 is further configured to determine that a difference between first distortion and second distortion is less than or equal to a first preset threshold. The first distortion is distortion of the residual coding result of the non-reference LPC parameter relative to the non-reference LPC parameter, and the second distortion is distortion of the direct coding result of the non-reference LPC parameter relative to the non-reference LPC parameter.

In an embodiment, the determining unit 802 is further configured to:

determine that a difference between a first bit quantity and a second bit quantity is greater than or equal to a second preset threshold. The first bit quantity is a quantity of bits required for directly coding the non-reference LPC parameter, and the second bit quantity is a quantity of bits required for coding the non-reference LPC parameter based on the direct coding result of the reference LPC parameter and the residual.

Figure 9:
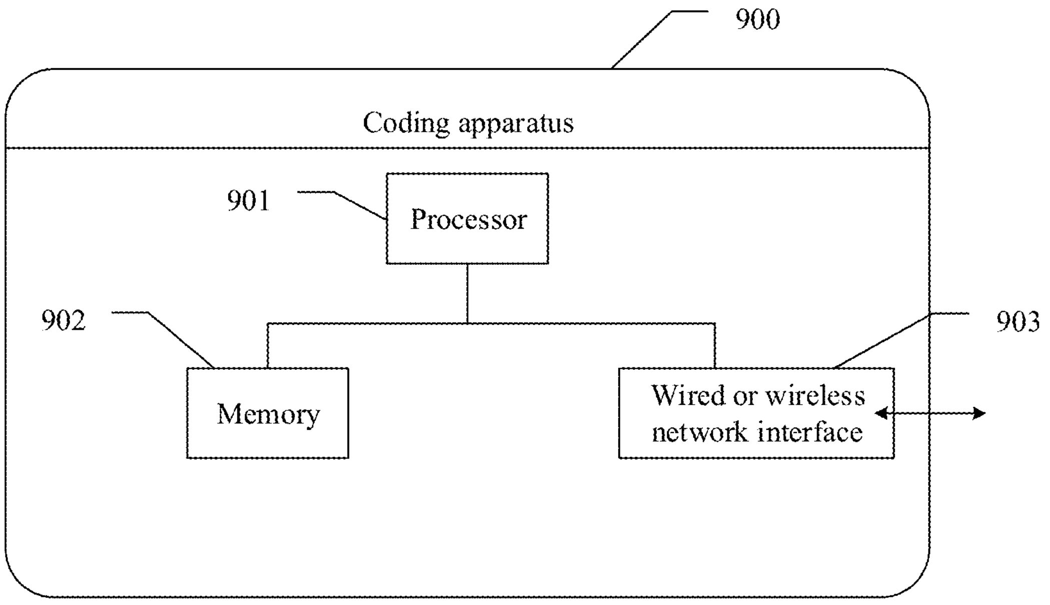
FIG. 9 is a schematic diagram of another embodiment of a coding apparatus in embodiments of this application.

Refer to FIG. 9. FIG. 9 is a schematic diagram of another embodiment of a coding apparatus in embodiments of this application.

The coding apparatus provided in this embodiment may be a processor, a server, a dedicated coding apparatus, or the like. A specific device form is not limited in this embodiment of this application.

The coding apparatus 900 may vary greatly with different configuration or performance, and may include one or more processors 901 and a memory 902. The memory 902 stores a program or data.

The memory 902 may be a volatile memory or a non-volatile memory. In an embodiment, the processor 901 is one or more central processing units (CPU), graphics processing units (GPU), or the like. The CPU may be a single-core CPU, or may be a multi-core CPU. The processor 901 may communicate with the memory 902, and execute, on the coding apparatus 900, a series of instructions in the memory 902.

The coding apparatus 900 further includes one or more wired or wireless network interfaces 903, for example, an Ethernet interface.

In an embodiment, although not shown in FIG. 9, the coding apparatus 900 may further include one or more power supplies and one or more input/output interfaces. The input/output interface may be configured to connect to a display, a mouse, a keyboard, a touchscreen device, a sensor device, or the like. The input/output interface is an optional component, and may exist or may not exist. This is not limited herein.

For a procedure executed by the processor 901 in the coding apparatus 900 in this embodiment, refer to the method procedures described in the foregoing method embodiments. Details are not described herein again.

The foregoing method embodiments of this application may be applied to the processor, or the processor implements the operations of the foregoing method embodiments. The processor may be an integrated circuit chip and has a signal processing capability. In an implementation process, the operations in the foregoing method embodiments can be implemented by using a hardware integrated logic circuit in the processor, or by using instructions in a form of software. The processor may be a central processing unit (CPU), a network processor (NP), a combination of a CPU and an NP, a digital signal processor (DSP), an application-specific integrated circuit (ASIC), a field programmable gate array (FPGA) or another programmable logic device, a discrete gate or a transistor logic device, or a discrete hardware component. It may implement or perform the methods, the operations, and logical block diagrams that are disclosed in this application. The general-purpose processor may be a microprocessor, or the processor may be any conventional processor or the like. Operations of the methods disclosed in this application may be directly executed and completed by using a hardware decoding processor, or may be executed and completed by using a combination of hardware and software modules in the decoding processor. The software module may be located in a mature storage medium in the art, such as a random access memory, a flash memory, a read-only memory, a programmable read-only memory, an electrically erasable programmable memory, or a register. The storage medium is located in a memory, and the processor reads information in the memory and completes the operations in the foregoing methods in combination with hardware of the processor. Although only one processor is shown in the figure, the apparatus may include a plurality of processors, or the processor includes a plurality of processing units. Specifically, the processor may be a single-core (single-CPU) processor, or may be a multi-core (multi-CPU) processor.

The memory is configured to store computer instructions executed by the processor. The memory may be a storage circuit, or may be a memory. The memory may be a volatile memory or a non-volatile memory, or may include both a volatile memory and a non-volatile memory. The non-volatile memory may be a read-only memory (ROM), a programmable read-only memory (PROM), an erasable programmable read-only memory (EPROM), an electrically erasable programmable read-only memory (EEPROM), or a flash memory. The volatile memory may be a random access memory (RAM) and is used as an external cache. The memory may be independent of the processor, or may be a storage unit in the processor. This is not limited herein. Although only one memory is shown in the figure, the apparatus may include a plurality of memories, or the memory includes a plurality of storage units.

A transceiver is configured to implement content interaction between the processor and another unit or network element. Specifically, the transceiver may be a communication interface of the apparatus, or may be a transceiver circuit or a communication unit. The transceiver may alternatively be a communication interface or a transceiver circuit of the processor. In a possible implementation, the transceiver may be a transceiver chip. The transceiver may further include a sending unit and/or a receiving unit. In a possible implementation, the transceiver may include at least one communication interface. In another possible implementation, the transceiver may alternatively be a unit implemented in a form of software. In each embodiment of this application, the processor may interact with another unit or network element through the transceiver. For example, the processor obtains or receives content from another network element through the transceiver. If the processor and the transceiver are two physically separated components, the processor may exchange content with another unit of the apparatus without using the transceiver.

In a possible implementation, the processor, the memory, and the transceiver may be connected to each other through a bus. The bus may be a peripheral component interconnect (PCI) bus or an extended industry standard architecture (EISA) bus, or the like. The bus may be classified into an address bus, a data bus, a control bus, and the like.

In embodiments of this application, the word "example", "for example", or the like is used to represent giving an example, an illustration, or a description. Any embodiment or design scheme described as an "example" or "for example" in embodiments of this application should not be explained as being more preferred or having more advantages than another embodiment or design scheme. Exactly, use of the word "example" or "for example" is intended to present a related concept in a specific manner.

In embodiments of this application, for ease of understanding, a plurality of examples are used for description. However, these examples are merely examples, but this does not mean that these examples are optimal implementations for implementing this application.

All or a part of the foregoing embodiments may be implemented by using software, hardware, firmware, or any combination thereof. When the software is used for implementation, all or a part of the embodiments may be implemented in a form of a computer program product.

The computer program product includes one or more computer instructions. When the computer-executable instructions are loaded and executed on a computer, all or a part of the procedures or the functions according to embodiments of this application are generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive solid state disk (SSD)), or the like.

What is claimed is:

1. A linear prediction coding (LPC) parameter coding method, comprising:

obtaining to-be-coded LPC parameters of at least two channels of an audio signal;

determining a reference LPC parameter from the to-be-coded LPC parameters of the at least two channels, wherein an LPC parameter other than the reference LPC parameter in the to-be-coded LPC parameters of the at least two channels is a non-reference LPC parameter;

obtaining a direct coding result of the reference LPC parameter;

obtaining a direct coding result of the non-reference LPC parameter;

determining a residual of the non-reference LPC parameter based on the reference LPC parameter;

determining a residual coding result of the non-reference LPC parameter based on the direct coding result of the reference LPC parameter and the residual;

upon determining that a difference between a first distortion and a second distortion is less than or equal to a first preset threshold, writing the direct coding result of the reference LPC parameter and the residual coding result of the non-reference LPC parameter into a coded bitstream, wherein the first distortion is distortion of the residual coding result of the non-reference LPC parameter relative to the non-reference LPC parameter, and the second distortion is distortion of the direct coding result of the non-reference LPC parameter relative to the non-reference LPC parameter; and upon determining that the difference between the first distortion and the second distortion is greater than the first preset threshold, writing the direct coding result of the reference LPC parameter and the direct coding result of the non-reference LPC parameter into the coded bitstream, wherein, when the to-be-coded LPC parameters of the at least two channels comprise to-be-coded LPC parameters of at least three channels, the determining a reference LPC parameter from the to-be-coded LPC parameters of the at least two channels comprises:

obtaining an absolute value of a difference between each LPC parameter in the to-be-coded LPC parameters of the at least three channels and other LPC parameters;

obtaining an average value of absolute values of differences between each LPC parameter and the other LPC parameters; and determining an LPC parameter that is in the LPC parameters and that has a minimum average value of the absolute values of the differences as the reference LPC parameter.

2. The LPC parameter coding method according to claim 1, wherein the difference comprises a mean squared error or a cosine distance.

3. The LPC parameter coding method according to claim 1, further comprising:

determining a plurality of parameter groups by grouping to-be-coded LPC parameters of a plurality of channels of the audio signal, wherein one of the plurality of parameter groups comprises the to-be-coded LPC parameters of the at least two channels, and the LPC parameters in the plurality of parameter groups have no intersection.

4. The LPC parameter coding method according to claim 3, wherein the determining a plurality of parameter groups by grouping to-be-coded LPC parameters of the plurality of channels of the audio signal comprises:

determining the plurality of parameter groups based on channel numbers of the plurality of channels of the audio signal; or determining the plurality of parameter groups based on a position of a speaker corresponding to each of the plurality of channels of the audio signal; or clustering the to-be-coded LPC parameters of the plurality of channels of the audio signal, to determine the plurality of parameter groups.

5. The LPC parameter coding method according to claim 4, wherein the clustering the to-be-coded LPC parameters of the plurality of channels of the audio signal, to determine the plurality of parameter groups comprises:

determining M LPC parameters from the to-be-coded LPC parameters of the plurality of channels, wherein an average value of absolute values of differences between the M LPC parameters is greater than or equal to an average value of absolute values of differences between any M LPC parameters in the LPC parameters of the plurality of channels, the MLPC parameters are clustering centers of M parameter groups, and M is a preset value; and performing clustering based on the M clustering centers, to determine the M parameter groups, wherein an absolute value of a difference between a first LPC parameter and a second LPC parameter in a first parameter group in the M parameter groups is less than an absolute value of a difference between the first LPC parameter and a third LPC parameter, the second LPC parameter is a clustering center of the first parameter group, the third LPC parameter is a clustering center of a second parameter group, and the first parameter group and the second parameter group are any two different parameter groups in the M parameter groups.

6. The LPC parameter coding method according to claim 1, wherein the obtaining to-be-coded LPC parameters of at least two channels of an audio signal comprises:

splitting original LPC parameters of the at least two channels of the audio signal, to obtain a high-dimensional LPC parameter group and a low-dimensional LPC parameter group, wherein the high-dimensional LPC parameter group comprises the to-be-coded LPC parameters of the at least two channels, or the low-dimensional LPC parameter group comprises the to-be-coded LPC parameters of the at least two channels;

or when the audio signal comprises a plurality of channels, the obtaining to-be-coded LPC parameters of at least two channels of an audio signal comprises:

splitting original LPC parameters of the plurality of channels of the audio signal, to obtain a high-dimensional LPC parameter group and a low-dimensional LPC parameter group; and obtaining a plurality of high-dimensional parameter groups by grouping LPC parameters in the high-dimensional LPC parameter group, wherein one of the plurality of high-dimensional parameter groups comprises the to-be-coded LPC parameters of the at least two channels, and LPC parameters in the plurality of high-dimensional parameter groups have no intersection; or obtaining a plurality of low-dimensional parameter groups by grouping LPC parameters in the low-dimensional LPC parameter group, wherein one of the plurality of low-dimensional parameter groups comprises the to-be-coded LPC parameters of the at least two channels, and LPC parameters in the plurality of low-dimensional parameter groups have no intersection.

7. The LPC parameter coding method according to claim 1, further comprising:

before determining the reference LPC parameter from the to-be-coded LPC parameters of the at least two channels, determining that an absolute value of a difference between LPC parameters of every two channels in the at least two channels is less than or equal to a preset threshold, wherein the difference between the LPC parameters of the two channels comprises an average value of mean squared errors or an average value of cosine distances between the LPC parameters of the two channels.

8. A linear prediction coding (LPC) parameter coding apparatus, comprising:

at least one processor; and one or more memories coupled to the at least one processor and storing programming instructions for execution by the at least one processor to cause the apparatus to:

obtain to-be-coded LPC parameters of at least two channels of an audio signal;

determine a reference LPC parameter from the to-be-coded LPC parameters of the at least two channels, wherein an LPC parameter other than the reference LPC parameter in the to-be-coded LPC parameters of the at least two channels is a non-reference LPC parameter;

obtain a direct coding result of the reference LPC parameter;

obtaining a direct coding result of the non-reference LPC parameter;

determine a residual of the non-reference LPC parameter based on the reference LPC parameter;

determine a residual coding result of the non-reference LPC parameter based on the direct coding result of the reference LPC parameter and the residual;

upon determining that a difference between a first distortion and a second distortion is less than or equal to a first preset threshold, write the direct coding result of the reference LPC parameter and the residual coding result of the non-reference LPC parameter into a coded bitstream, wherein the first distortion is distortion of the residual coding result of the non-reference LPC parameter relative to the non-reference LPC parameter, and the second distortion is distortion of the direct coding result of the non-reference LPC parameter relative to the non-reference LPC parameter; and upon determining that the difference between the first distortion and the second distortion is greater than the first preset threshold, write the direct coding result of the reference LPC parameter and the direct coding result of the non-reference LPC parameter into the coded bitstream, wherein, when the to-be-coded LPC parameters of the at least two channels comprise to-be-coded LPC parameters of at least three channels, the programming instructions for execution by the at least one processor to cause the apparatus further to:

obtain an absolute value of a difference between each LPC parameter in the to-be-coded LPC parameters of the at least three channels and other LPC parameters;

obtain an average value of absolute values of differences between each LPC parameter and the other LPC parameters; and determine an LPC parameter that is in the LPC parameters and that has a minimum average value of the absolute values of the differences as the reference LPC parameter.

9. The LPC parameter coding apparatus according to claim 8, wherein the difference comprises a mean squared error or a cosine distance.

10. The LPC parameter coding apparatus according to claim 8, wherein the programming instructions for execution by the at least one processor to cause the apparatus further to:

determine a plurality of parameter groups by grouping to-be-coded LPC parameters of a plurality of channels of the audio signal, wherein one of the plurality of parameter groups comprises the to-be-coded LPC parameters of the at least two channels, and the LPC parameters in the plurality of parameter groups have no intersection.

11. The LPC parameter coding apparatus according to claim 10, wherein the programming instructions for execution by the at least one processor to cause the apparatus further to:

determine the plurality of parameter groups based on channel numbers of the plurality of channels of the audio signal; or determine the plurality of parameter groups based on a position of a speaker corresponding to each of the plurality of channels of the audio signal; or cluster the to-be-coded LPC parameters of the plurality of channels of the audio signal, to determine the plurality of parameter groups.

12. The LPC parameter coding apparatus according to claim 11, wherein the programming instructions for execution by the at least one processor to cause the apparatus further to:

determine M LPC parameters from the to-be-coded LPC parameters of the plurality of channels, wherein an average value of absolute values of differences between the M LPC parameters is greater than or equal to an average value of absolute values of differences between any M LPC parameters in the LPC parameters of the plurality of channels, the M LPC parameters are clustering centers of M parameter groups, and M is a preset value; and perform clustering based on the M clustering centers, to determine the M parameter groups, wherein an absolute value of a difference between a first LPC parameter and a second LPC parameter in a first parameter group in the M parameter groups is less than an absolute value of a difference between the first LPC parameter and a third LPC parameter, the second LPC parameter is a clustering center of the first parameter group, the third LPC parameter is a clustering center of a second parameter group, and the first parameter group and the second parameter group are any two different parameter groups in the M parameter groups.

13. The LPC parameter coding apparatus according to claim 8, wherein the programming instructions for execution by the at least one processor to cause the apparatus further to:

split original LPC parameters of the at least two channels of the audio signal, to obtain a high-dimensional LPC parameter group and a low-dimensional LPC parameter group, wherein the high-dimensional LPC parameter group comprises the to-be-coded LPC parameters of the at least two channels, or the low-dimensional LPC parameter group comprises the to-be-coded LPC parameters of the at least two channels;

or when the audio signal comprises a plurality of channels, the programming instructions for execution by the at least one processor to cause the apparatus further to:

split original LPC parameters of the plurality of channels of the audio signal, to obtain a high-dimensional LPC parameter group and a low-dimensional LPC parameter group; and obtain a plurality of high-dimensional parameter groups by grouping LPC parameters in the high-dimensional LPC parameter group, wherein one of the plurality of high-dimensional parameter groups comprises the to-be-coded LPC parameters of the at least two channels, and LPC parameters in the plurality of high-dimensional parameter groups have no intersection; or obtain a plurality of low-dimensional parameter groups by grouping LPC parameters in the low-dimensional LPC parameter group, wherein one of the plurality of low-dimensional parameter groups comprises the to-be-coded LPC parameters of the at least two channels, and LPC parameters in the plurality of low-dimensional parameter groups have no intersection.

14. The LPC parameter coding apparatus according to claim 8, wherein the programming instructions for execution by the at least one processor to cause the apparatus further to:

determine that an absolute value of a difference between LPC parameters of every two channels in the at least two channels is less than or equal to a preset threshold, wherein the difference between the LPC parameters of the two channels comprises an average value of mean squared errors or an average value of cosine distances between the LPC parameters of the two channels.

15. A computer program product comprising computer-executable instructions stored on a non-transitory computer-readable medium that, when executed by a processor, cause an apparatus to:

obtain to-be-coded linear prediction coding (LPC) parameters of at least two channels of an audio signal;

determine a reference LPC parameter from the to-be-coded LPC parameters of the at least two channels, wherein an LPC parameter other than the reference LPC parameter in the to-be-coded LPC parameters of the at least two channels is a non-reference LPC parameter;

obtain a direct coding result of the reference LPC parameter;

obtaining a direct coding result of the non-reference LPC parameter;

determine a residual of the non-reference LPC parameter based on the reference LPC parameter;

determine a residual coding result of the non-reference LPC parameter based on the direct coding result of the reference LPC parameter and the residual;

upon determining that a difference between a first distortion and a second distortion is less than or equal to a first preset threshold, write the direct coding result of the reference LPC parameter and the residual coding result of the non-reference LPC parameter into a coded bitstream, wherein the first distortion is distortion of the residual coding result of the non-reference LPC parameter relative to the non-reference LPC parameter, and the second distortion is distortion of the direct coding result of the non-reference LPC parameter relative to the non-reference LPC parameter; and upon determining that the difference between the first distortion and the second distortion is greater than the first preset threshold, write the direct coding result of the reference LPC parameter and the direct coding result of the non-reference LPC parameter into the coded bitstream, wherein, when the to-be-coded LPC parameters of the at least two channels comprise to-be-coded LPC parameters of at least three channels, the computer-executable instructions, when executed by the processor, cause the apparatus to further:

obtain an absolute value of a difference between each LPC parameter in the to-be-coded LPC parameters of the at least three channels and other LPC parameters;

obtain an average value of absolute values of differences between each LPC parameter and the other LPC parameters; and determine an LPC parameter that is in the LPC parameters and that has a minimum average value of the absolute values of the differences as the reference LPC parameter.

* * * * *